(12) United States Patent
Smuk

(10) Patent No.: US 10,787,098 B2
(45) Date of Patent: Sep. 29, 2020

(54) RECLINER FOR A VEHICLE SEAT

(71) Applicant: FAURECIA AUTOMOTIVE SEATING, LLC, Auburn Hills, MI (US)

(72) Inventor: Wojciech Smuk, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 156 days.

(21) Appl. No.: 16/084,366

(22) PCT Filed: Apr. 10, 2017

(86) PCT No.: PCT/US2017/026824
§ 371 (c)(1),
(2) Date: Sep. 12, 2018

(87) PCT Pub. No.: WO2017/180520
PCT Pub. Date: Oct. 19, 2017

(65) Prior Publication Data
US 2019/0070980 A1   Mar. 7, 2019

Related U.S. Application Data

(60) Provisional application No. 62/320,922, filed on Apr. 11, 2016.

(51) Int. Cl.
*B60N 2/02* (2006.01)
*B60N 2/20* (2006.01)
(Continued)

(52) U.S. Cl.
CPC .............. *B60N 2/0232* (2013.01); *B60N 2/20* (2013.01); *B60N 2/2227* (2013.01); *B60N 2/236* (2015.04); *B60N 2/2358* (2013.01)

(58) Field of Classification Search
CPC .......... B60N 2/20; B60N 2/22; B60N 2/2356; B60N 2/2358; B60N 2/0232; B60N 2/236; B60N 2/2227
(Continued)

(56) References Cited

U.S. PATENT DOCUMENTS

| 3,550,875 A | 12/1970 | Settimi |
| 5,104,084 A | 4/1992 | Kumagai |

(Continued)

FOREIGN PATENT DOCUMENTS

| CN | 103182961 B | 7/2015 |
| DE | 10309083 A1 | 9/2004 |
| WO | 03074316 A1 | 9/2003 |

OTHER PUBLICATIONS

Extended European Search Report for European App. No. 17193929.1 established Feb. 26, 2018, 4111 EP ||, 8 pages.

(Continued)

*Primary Examiner* — Milton Nelson, Jr.
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom between an upright position and a folded-forward position. The occupant support further includes a seat-motion controller configured to control movement of the seat back relative to the seat bottom.

17 Claims, 20 Drawing Sheets

(51) Int. Cl.
*B60N 2/235* (2006.01)
*B60N 2/22* (2006.01)

(58) Field of Classification Search
USPC ...................................................... 297/367 P
See application file for complete search history.

(56) References Cited

U.S. PATENT DOCUMENTS

| | | | |
|---|---|---|---|
| 5,299,853 | A | 4/1994 | Griswold |
| 5,871,259 | A | 2/1999 | Gehart |
| 6,788,048 | B2 | 9/2004 | Hedayat |
| 7,192,089 | B2 | 3/2007 | Boudinot |
| 7,222,919 | B2 | 5/2007 | Uramichi et al. |
| 7,293,752 | B2 | 11/2007 | McCulloch |
| 7,330,008 | B2 | 2/2008 | Lee |
| 7,360,838 | B2 | 4/2008 | Smuk |
| 7,594,699 | B2 | 9/2009 | Satta |
| 8,285,454 | B2 | 10/2012 | Norton |
| 8,491,054 | B2 | 7/2013 | Myers |
| 8,651,578 | B2 | 2/2014 | Yamada et al. |
| 8,845,027 | B2 | 9/2014 | Nock |
| 9,387,781 | B2 | 7/2016 | Matt |
| 2002/0171280 | A1 | 11/2002 | Okazaki et al. |
| 2004/0217638 | A1 | 11/2004 | Shao |
| 2006/0202537 | A1 | 9/2006 | Smuk |
| 2007/0289092 | A1 | 12/2007 | Rohee |
| 2012/0074750 | A1 | 3/2012 | Moriyama |
| 2012/0205956 | A1 | 8/2012 | Nock et al. |
| 2012/0261963 | A1 | 10/2012 | Heyer |
| 2013/0320735 | A1 | 12/2013 | McCulloch |
| 2014/0145485 | A1* | 5/2014 | Couasnon ............ B60N 2/2358 297/378.12 |
| 2014/0152067 | A1 | 6/2014 | Pleskot |
| 2014/0225411 | A1 | 8/2014 | Matt |
| 2014/0239693 | A1* | 8/2014 | Nock .................. B60N 2/2252 297/361.1 |
| 2015/0069809 | A1 | 3/2015 | Matt |
| 2016/0023575 | A1* | 1/2016 | Gallienne ............. B60N 2/236 297/362.12 |
| 2016/0023577 | A1 | 1/2016 | Yamada et al. |
| 2016/0023578 | A1 | 1/2016 | Tame et al. |
| 2016/0101710 | A1 | 4/2016 | Bonk |
| 2016/0280098 | A1 | 9/2016 | Frye |

OTHER PUBLICATIONS

Office Action dated Feb. 6, 2019 for U.S. Appl. No. 15/718,089, 4111 US-U ‖ (pp. 1-7).

Office Action dated Feb. 26, 2019 for U.S. Appl. No. 15/829,071, 4172 US-U ‖, (pp. 1-8).

PCT International Search Report and Written Opinion completed by the ISA/KR dated Jul. 14, 2017 and issued in connection with PCT/US2017/026824.

European Search Report for European App. No. 17782923.1 dated Nov. 18, 2019, 3980 EP ‖, 9 pages.

* cited by examiner

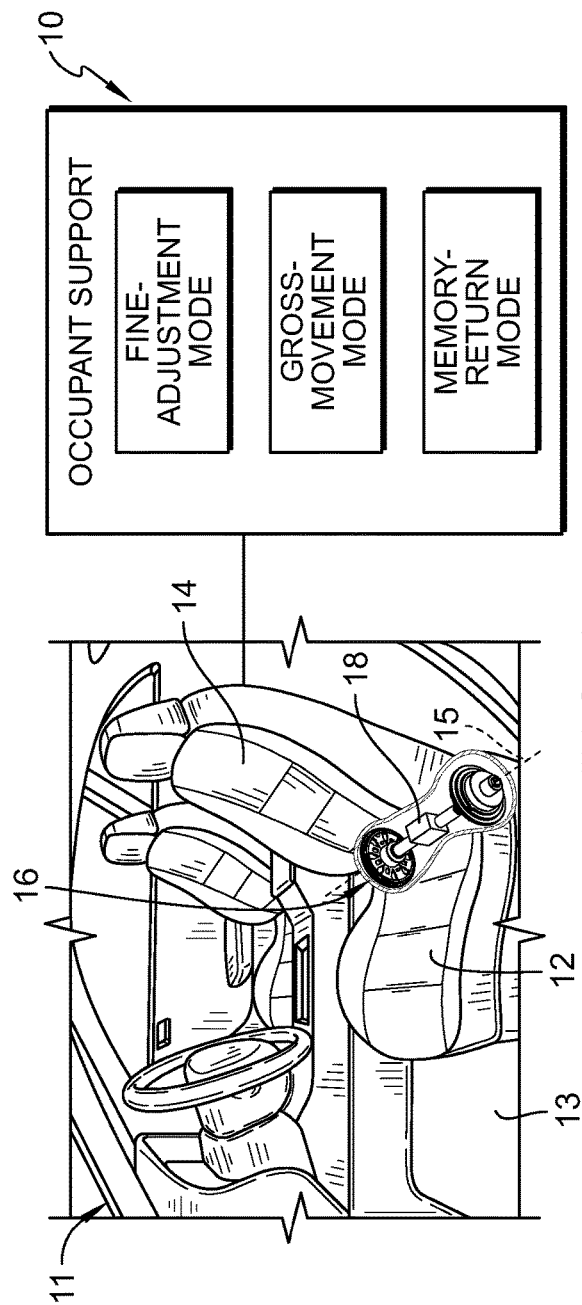
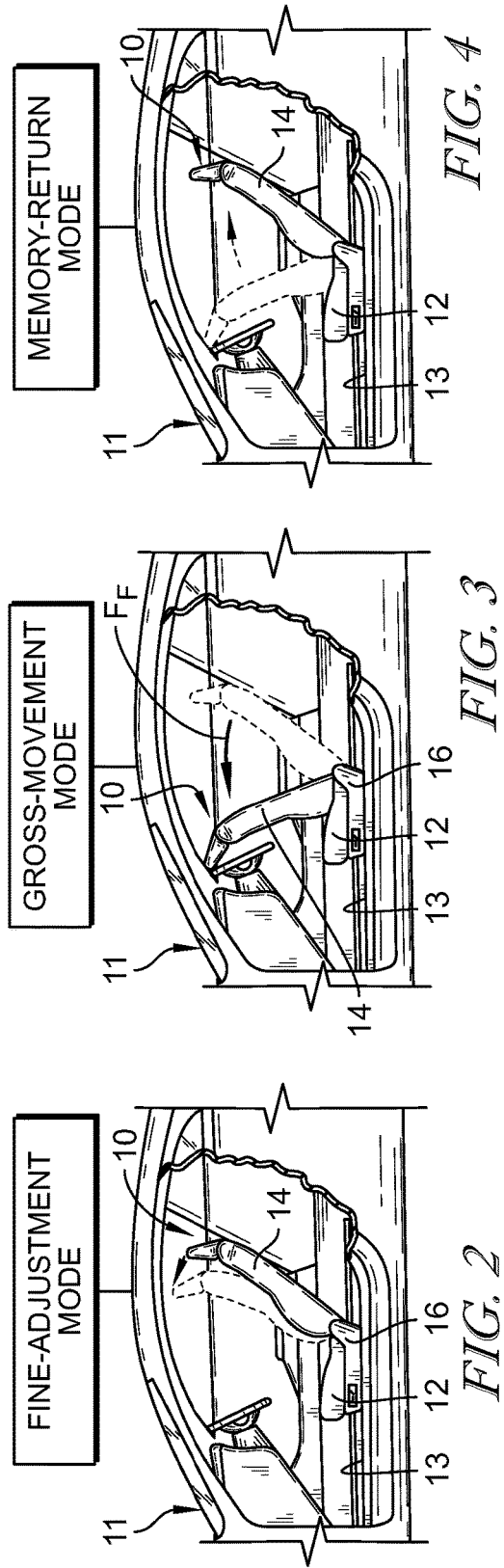

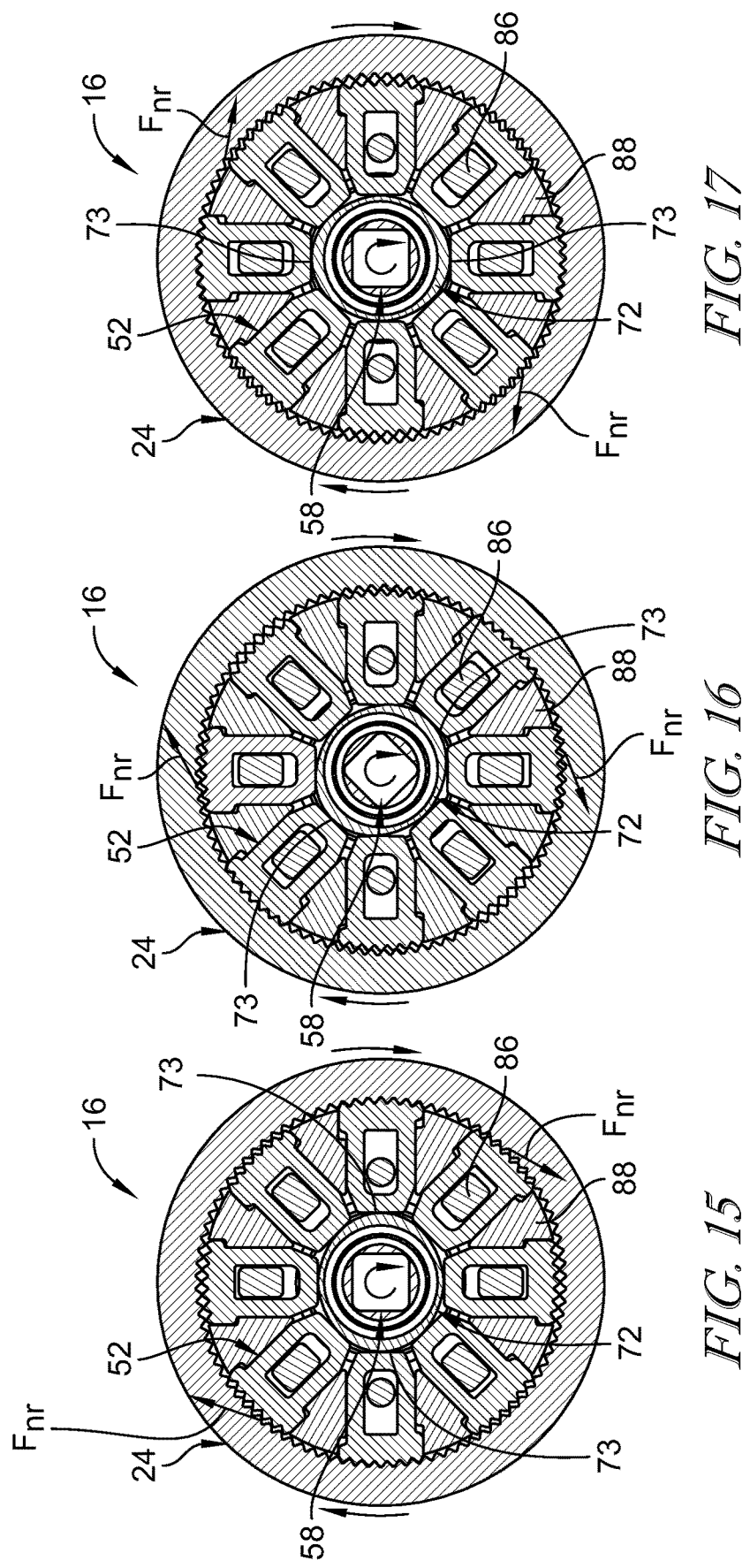

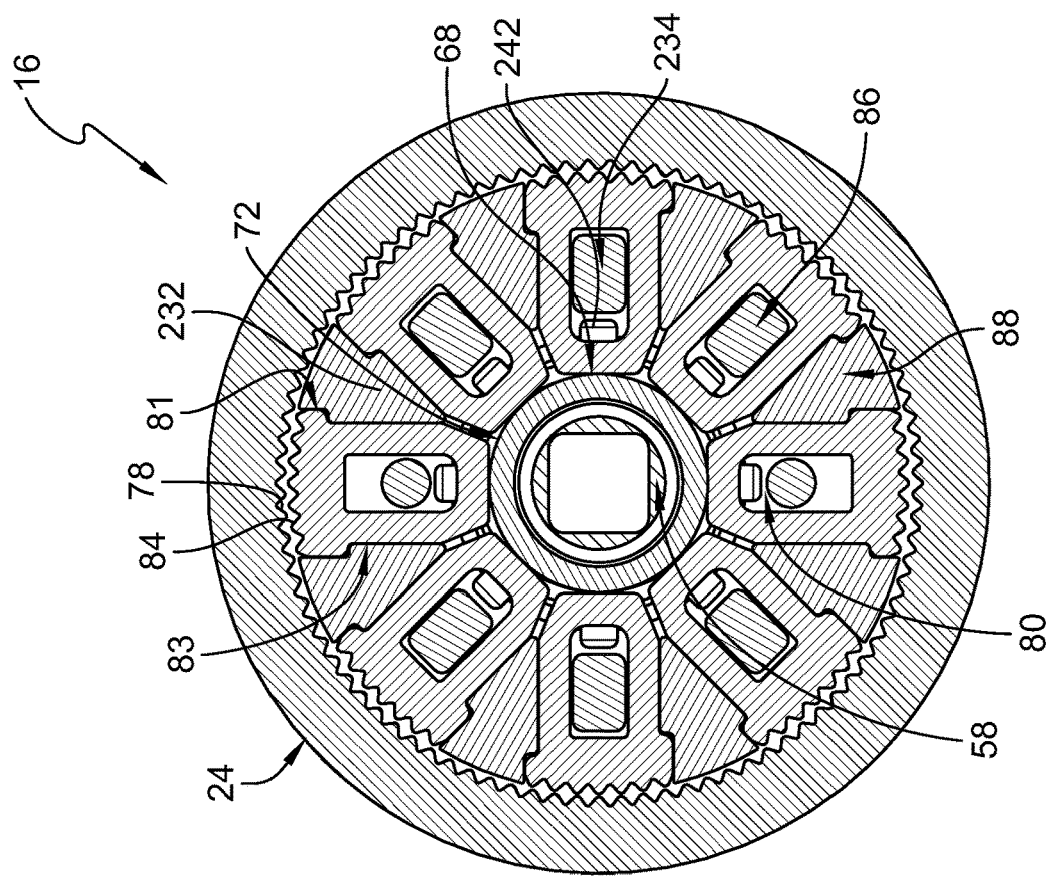
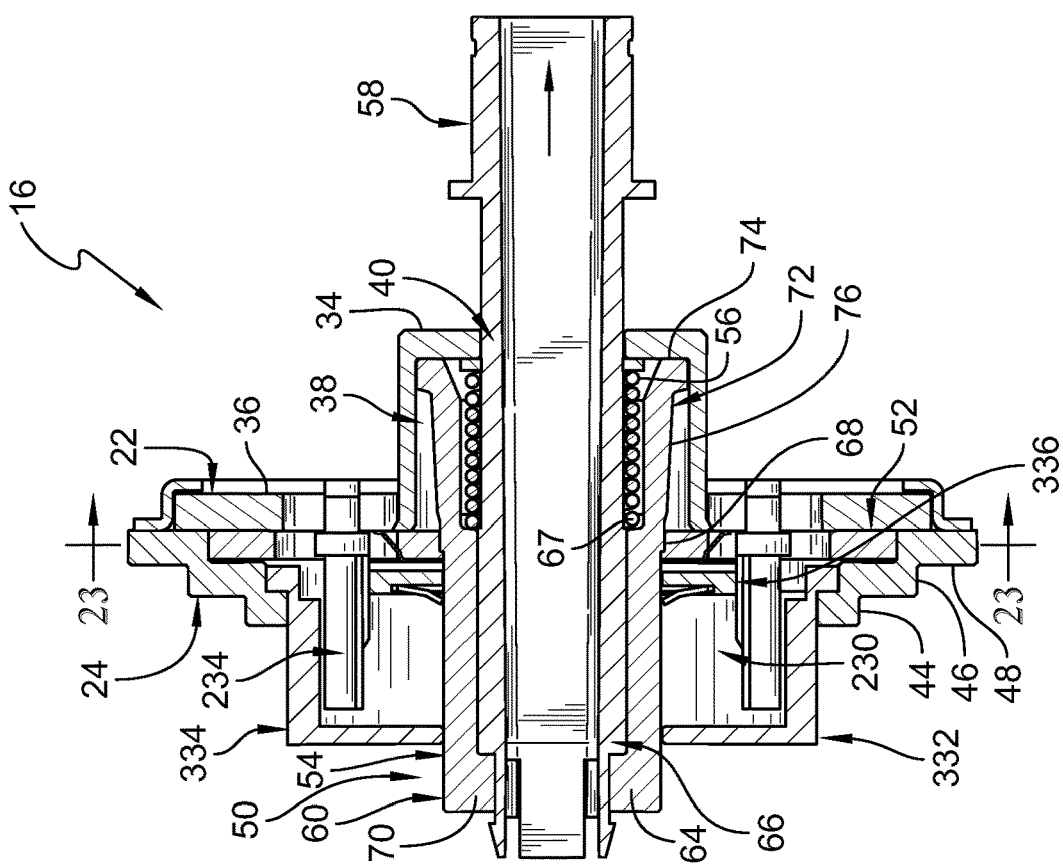

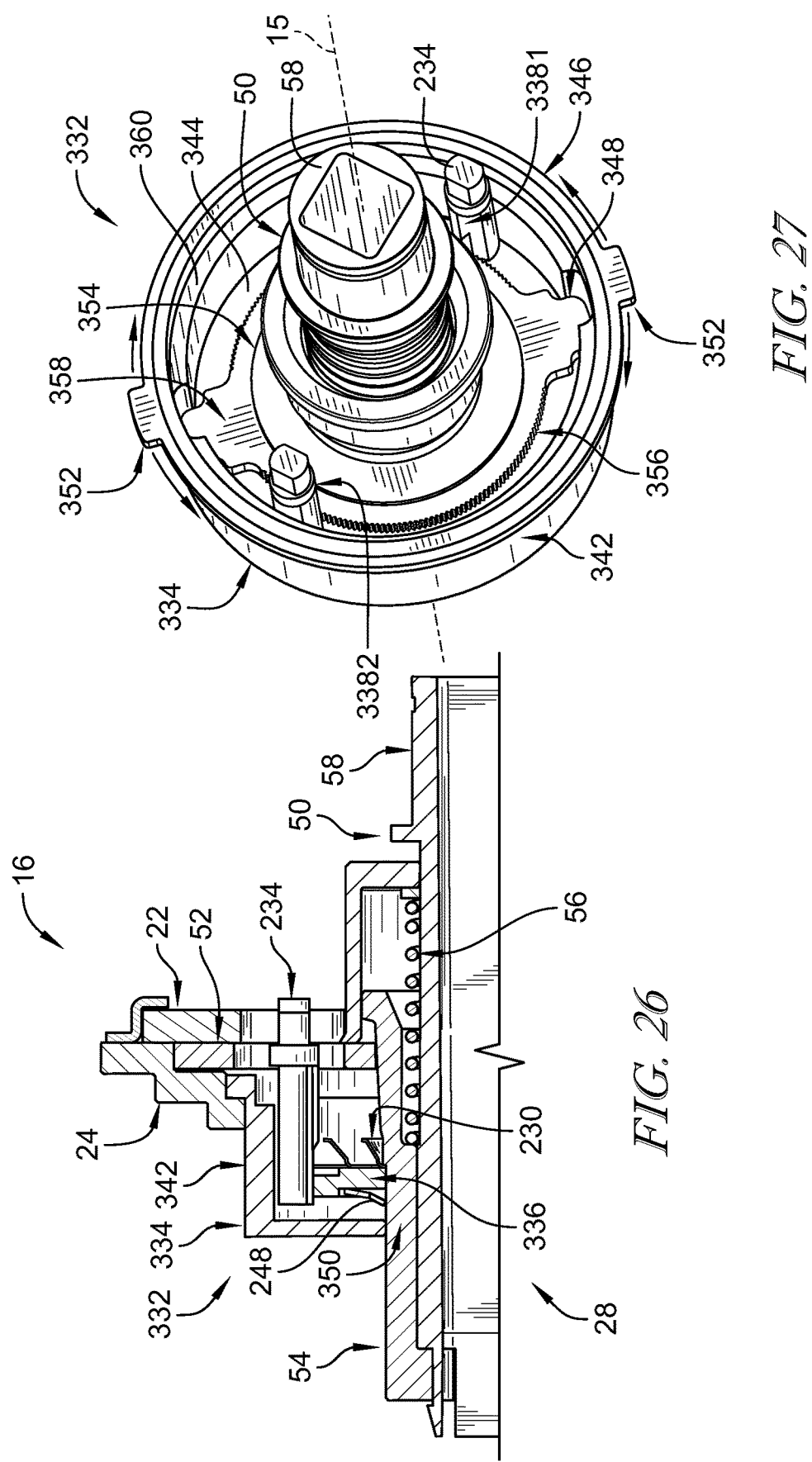

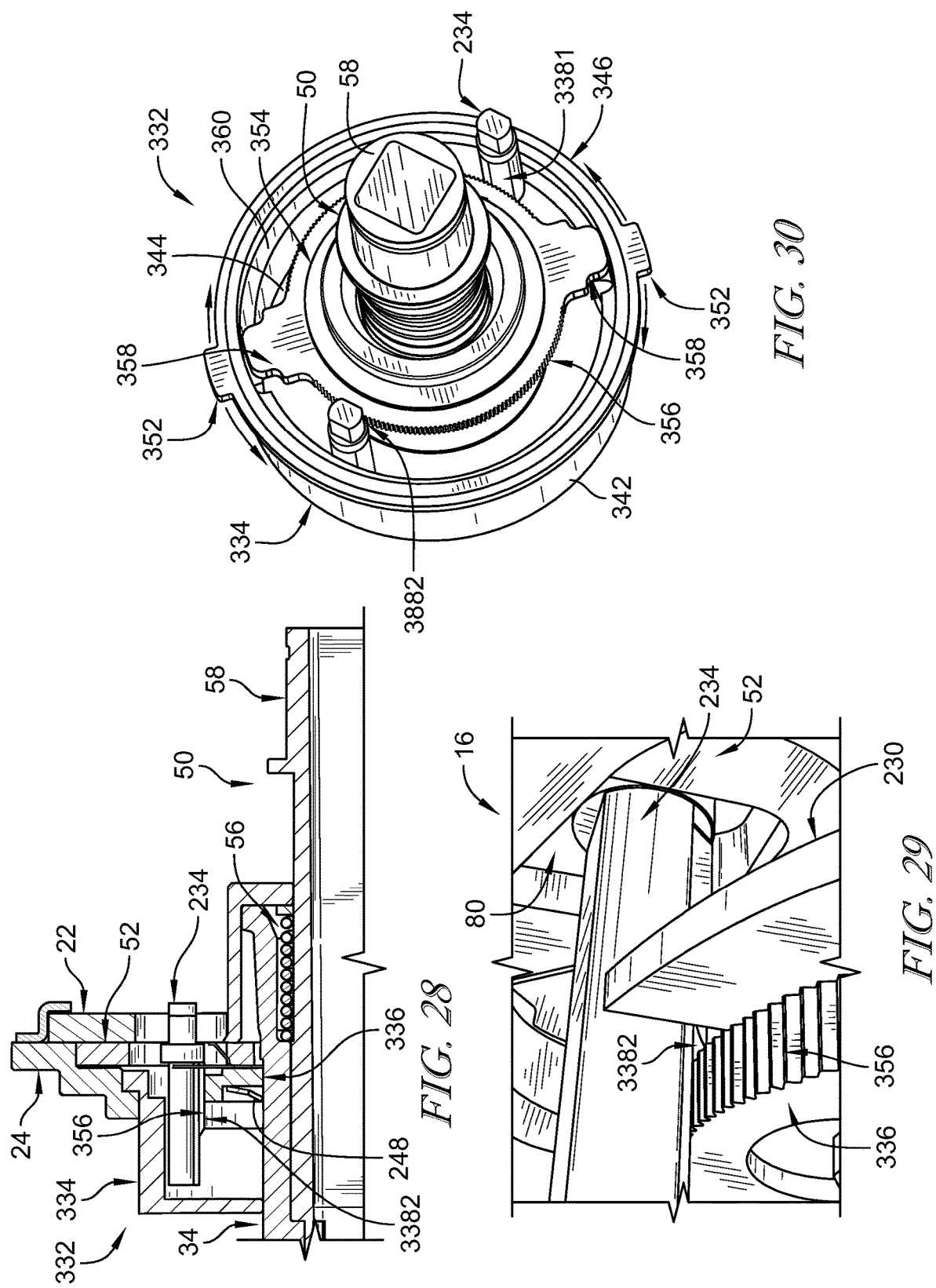

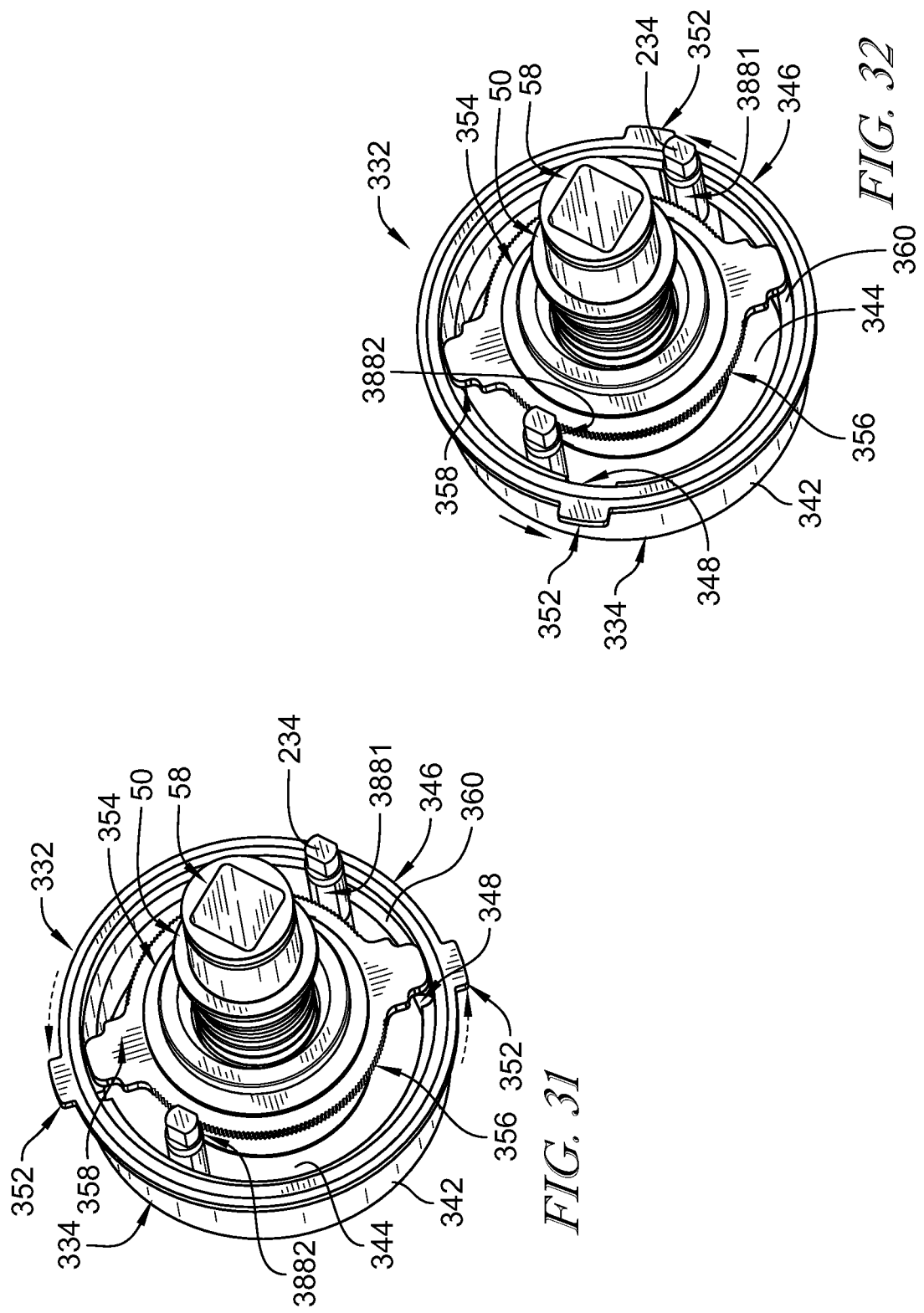

RECLINER FOR A VEHICLE SEAT

CROSS REFERENCE TO RELATED APPLICATIONS

This application is a U.S. national counterpart application of PCT International Application Serial No. PCT/US2017/026824, filed Apr. 10, 2017 and claims the benefit of and priority to U.S. Provisional Patent Application Ser. No. 62/320,922, filed Apr. 11, 2016, the entire contents of each of which are expressly incorporated by reference herein.

BACKGROUND

The present disclosure relates to occupant supports, and particularly to movable occupant supports. More particularly, the present disclosure relates to occupant supports with reclining seat backs for use in vehicles.

SUMMARY

According to the present disclosure, a vehicle includes an occupant support mounted to a floor of the vehicle. The occupant support includes a seat bottom coupled to the floor of the vehicle for movement therewith and a seat back coupled to the seat bottom for movement about a seat-back pivot axis relative to the seat bottom between an upright position and a folded-forward position. The occupant support further includes a seat-motion controller configured to control movement of the seat back about the seat-back pivot axis relative to the seat bottom.

In illustrative embodiments, the seat-motion controller is configured to move the occupant support in one of a fine-adjustment mode and a gross-adjustment mode. In the fine-adjustment mode, the seat-motion controller pivots the seat back about the seat-back pivot axis relative to the seat bottom in response to power being supplied to the seat-motion controller and the seat-motion controller blocks the seat back from rotating relative to the seat bottom while power is not supplied to the seat-motion controller to lock the seat back in a selected memory position relative to the seat bottom. In the gross-movement mode, the seat-motion controller frees the seat back to pivot about the seat-back pivot axis relative to the seat bottom between the upright position and the folded-forward position in response to a folding force applied to the seat back. The folding force may be applied by an operator of the occupant support, gravity acting on the seat back, a bias member coupled to the seat back, the seat-motion controller.

In illustrative embodiments, the seat-motion controller includes a fixed flange, a mobile flange, and a recliner control unit. The fixed flange is coupled to the seat bottom and configured to be blocked from rotating about the seat-back pivot axis relative to the seat bottom. The mobile flange is coupled to the seat back and configured to pivot the seat back when the mobile flange is rotated about the seat-back pivot axis relative to the fixed flange. The recliner control unit includes a mode controller including a cam-shaft assembly that extends into the fixed flange and the mobile flange and a plurality of pawls arranged circumferentially around the cam-shaft assembly and aligned axially with the mobile flange.

In illustrative embodiments, the cam-shaft assembly is configured to move axially relative to the seat-back pivot axis and the plurality of pawls between an extended position and a retracted position to move the occupant support in the fine-adjustment mode and the gross-movement mode, respectively. In the extended position, a cam included in the cam-shaft assembly is aligned axially with the plurality of pawls and pushes at least one of the plurality of pawls radially outward away from the seat-back pivot axis toward the mobile flange so that the occupant support may be moved in the fine-adjustment mode. In the retracted position, a central hub included in the cam-shaft assembly is aligned axially with the plurality of pawls to allow the plurality of pawls to move radially inward toward the cam-shaft assembly and away from the mobile flange so that the occupant support may be moved in the gross-movement mode.

In illustrative embodiments, the cam-shaft assembly is configured to rotate about the seat-back pivot axis in response to power being supplied to the cam-shaft assembly by a motor. As the cam-shaft assembly rotates in the extended position, the cam included in the cam-shaft assembly pushes the plurality of pawls radially outward in a predetermined sequence so that the plurality of pawls apply a rotational force to the mobile flange. The rotational force causes the mobile flange to rotate about the seat-back pivot axis relative to the fixed flange and, as a result, the seat back pivots relative to the seat bottom.

In the illustrative embodiment, the recliner control unit further includes a pawl retainer coupled to the cam-shaft assembly for axial movement therewith. The pawl retainer is configured to allow radial movement of the plurality of pawls relative to the seat-back pivot axis when the cam-shaft assembly is in the extended position and to block radial movement of the plurality of pawls relative to the seat-back pivot axis when the cam-shaft assembly is in the retracted position. The pawl retainer, therefore, blocks the plurality of pawls from interacting with the mobile flange when the occupant support is moved in the gross-movement mode. As a result, undesirable noise and tactile sensations may be reduced or eliminated when the occupant support is moved in the gross-movement mode.

In illustrative embodiments, the recliner control unit further includes a memory-return controller. The memory-return controller is configured to block the cam-shaft assembly from moving from the retracted position to the extended position unless the occupant support is in the selected memory position. As a result, the occupant support is blocked from being locked in position in the gross-movement mode and is movable or lockable in the fine-adjustment mode when the seat back is returned to its previous selected memory position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a passenger vehicle showing an occupant support in accordance with the present disclosure on a driver side of the passenger vehicle, the occupant support includes a seat bottom mounted to a floor of the vehicle, a seat back mounted to the seat bottom to pivot relative to the seat bottom, and a seat-motion controller coupled to the seat bottom and the seat back to control motion of the seat back about a seat-back pivot axis relative to the seat bottom, and suggesting that the seat-motion controller is configured to move the occupant support between an upright position and a folded-forward position in one of a fine-adjustment mode as suggested in FIG. 2, a gross-movement mode as suggested in FIG. 3, and a memory-return mode as suggested in FIG. 4;

FIG. 2 is a view similar to FIG. 1 showing the occupant support in the fine-adjustment mode and suggesting that the seat-motion controller pivots the seat back about the seat-back pivot axis relative to the seat bottom incrementally in response to power being supplied to the seat-motion controller and the seat-motion controller blocks the seat back from pivoting relative to the seat bottom while power is not supplied to the seat-motion controller to lock the seat back in a selected memory position relative to the seat bottom;

FIG. 3 is a view similar to FIG. 1 showing the occupant support in the gross-movement mode and suggesting that the seat back is free to pivot freely about the seat-back pivot axis relative to the seat bottom from the selected memory position between the upright position and the folded-forward position in response to a folding force applied to the seat back without supplying power to the seat-motion controller;

FIG. 4 is a view similar to FIG. 3 showing the occupant support in the memory-return mode and suggesting that the occupant support is blocked from moving from the gross-movement mode to the fine-adjustment mode until the seat back is returned to the selected memory position relative to the seat bottom;

FIGS. 15-17 are a series of views suggesting that rotation of the cam-shaft assembly about the seat-back pivot axis causes the eccentric shaped cam to move the plurality of pawls radially outwardly into and inwardly out of engagement with the mobile flange in a predetermined sequence and that the mating teeth of the plurality of pawls and the mobile flange applies a net rotation force to the mobile flange to cause the mobile flange to rotate about the seat-back pivot axis relative to the fixed flange and further suggesting that, for all positions, at least one pawl is engaged with the mobile flange to block the mobile flange from rotating about the seat-back pivot axis when the cam-shaft assembly is not rotating;

FIG. 15 is a sectional view of the seat-motion controller showing the eccentric shaped cam included in the cam-shaft assembly in a first position in which the cam pushes a first subset of the plurality of pawls radially outward into engagement with mobile flange and suggesting that rotation of the cam-shaft assembly about the seat-back pivot axis moves the plurality of pawls radially outwardly and inwardly in the predetermined sequence to cause the mobile flange to rotate about the seat-back pivot axis relative to the fixed flange;

FIG. 16 is a view similar to FIG. 15 showing the eccentric shaped cam included in the cam-shaft assembly rotated from the first position shown in FIG. 15 to a second position in which the cam pushes a second subset of the plurality of pawls radially outward into engagement with mobile flange to cause the mobile flange to rotate about the seat-back pivot axis relative to the fixed flange;

FIG. 17 is a view similar to FIG. 16 showing the eccentric shaped cam of the cam-shaft assembly rotated from the second position shown in FIG. 16 to a third position in which the cam pushes a third subset of the plurality of pawls radially outward into engagement with mobile flange to cause the mobile flange to rotate about the seat-back pivot axis relative to the fixed flange;

FIG. 22 is a view similar to FIG. 13 showing that the pawl-retainer tabs included in the pawl retainer are received in pawl-guide slots formed in the plurality of pawls to pull the plurality of pawls radially inward and to block radial outward movement of the pawls when the occupant support is moved in the gross-movement mode;

FIG. 23 is a section view of the seat-motion controller taken along line 23-23 of FIG. 22 showing that the plurality of pawl-retainer tabs included in the pawl retainer extend into the pawls to block the plurality of pawls from moving radially outward toward the mobile flange while the occupant support is moved in the gross-movement mode so that the mobile flange is free to rotate about the seat-back pivot axis without interfering with the plurality of pawls;

FIG. 26 is a partial section view of the recliner control unit when the occupant support is in the fine-adjustment mode showing that the memory cover included in the memory-return controller is coupled to the mobile flange for rotation therewith and that the memory disc is coupled to the rotor for axial movement therewith and is aligned with the side wall of the cover;

FIG. 27 is a perspective view of the memory-return controller while the occupant support is in the fine-adjustment mode showing that the guide tabs included in the memory disc are received in the guide channels formed in the cover to cause the memory disc to rotate with the cover and the mobile flange and suggesting that the pins are fixed in place relative to the memory disc to limit rotational travel of the memory disc and, thus, the seat back from rotation beyond the upright position and the folded-forward position;

FIG. 28 is a partial section view of the recliner control unit when the occupant support is in the gross-movement mode showing that the cam-shaft assembly has moved axially toward the fixed flange and that the memory disc has moved axially with the cam-shaft assembly to cause the guide tabs included in the memory disc to exit the guide channels formed in the cover and to cause the disc teeth included in the memory disc to mate with the disc-retainer teeth coupled to the pins to block rotation of the memory disc;

FIG. 29 is an enlarged perspective view of the recliner control unit showing the disc teeth included in the memory disc mating with the disc-retainer tooth coupled to the pins and suggesting that disc teeth mate with the disc-retainer tooth to block rotation of the memory disc about the seat-back pivot axis relative to the pin to store the selected memory position of the seat back;

FIG. 30 is a view similar to FIG. 27 after the cam-shaft assembly has moved axially toward the fixed flange to cause the guide tabs included in the memory disc to exit the guide channels formed in the cover to allow the cover and mobile flange to rotate relative to the memory disc and showing that the disc teeth are mated with the disc-retainer teeth to block rotation of the memory disc relative to the fixed flange;

FIG. 31 is a view similar to FIG. 30 suggesting that when the occupant support is moved in the gross-movement mode, the memory disc is spaced apart from the side wall of the cover so that the guide tabs are out of the guide channels formed in the cover to allow the cover to rotate relative to the memory disc and that the memory disc mates with the disc-retainer teeth to block rotation of the memory disc;

FIG. 32 is a view similar to FIG. 31 after the cover and the mobile flange have rotated relative to the memory disc and the fixed flange and suggesting that the side wall included in the cover blocks the guide tabs included in the memory disc from moving axially toward the mobile flange while the guide channels are misaligned with the guide tabs so that the cam-shaft assembly is blocked from moving axially to move the occupant support from the gross-movement mode to the fine-adjustment mode until the seat back is returned to the selected memory position in which the guide channels realign with the guide tabs included in the memory disc.

DETAILED DESCRIPTION

An occupant support 10 in accordance with the present disclosure is adapted for use in a vehicle 11 as shown in FIGS. 1-4. Occupant support 10 is configured to move between an upright position, shown in FIGS. 1, 2, and 4 and a folded-forward position, suggested in FIG. 3, in one of a fine-adjustment mode, a gross-movement mode, and a memory-return mode. In the illustrative enbodiment, occupant support 10 is a driver side occupant support 10.

In the fine-adjustment mode, occupant support 10 moves incrementally between the upright position and the folded-forward position in response to a user input and locks in position when the user input is removed to set a selected memory position as suggested in FIG. 2. In the gross-movement mode, occupant support 10 moves freely between the upright position and the folded-forward position in response to a folding force $F_F$ without locking into position when folding force $F_F$ is removed as suggested in FIG. 3. In the memory-return mode, occupant support 10 is returned to the selected memory position to move occupant support 10 from the gross-movement mode to the fine-adjustment mode and to lock occupant support 10 into the selected memory position as suggested in FIG. 4.

Figure 5:
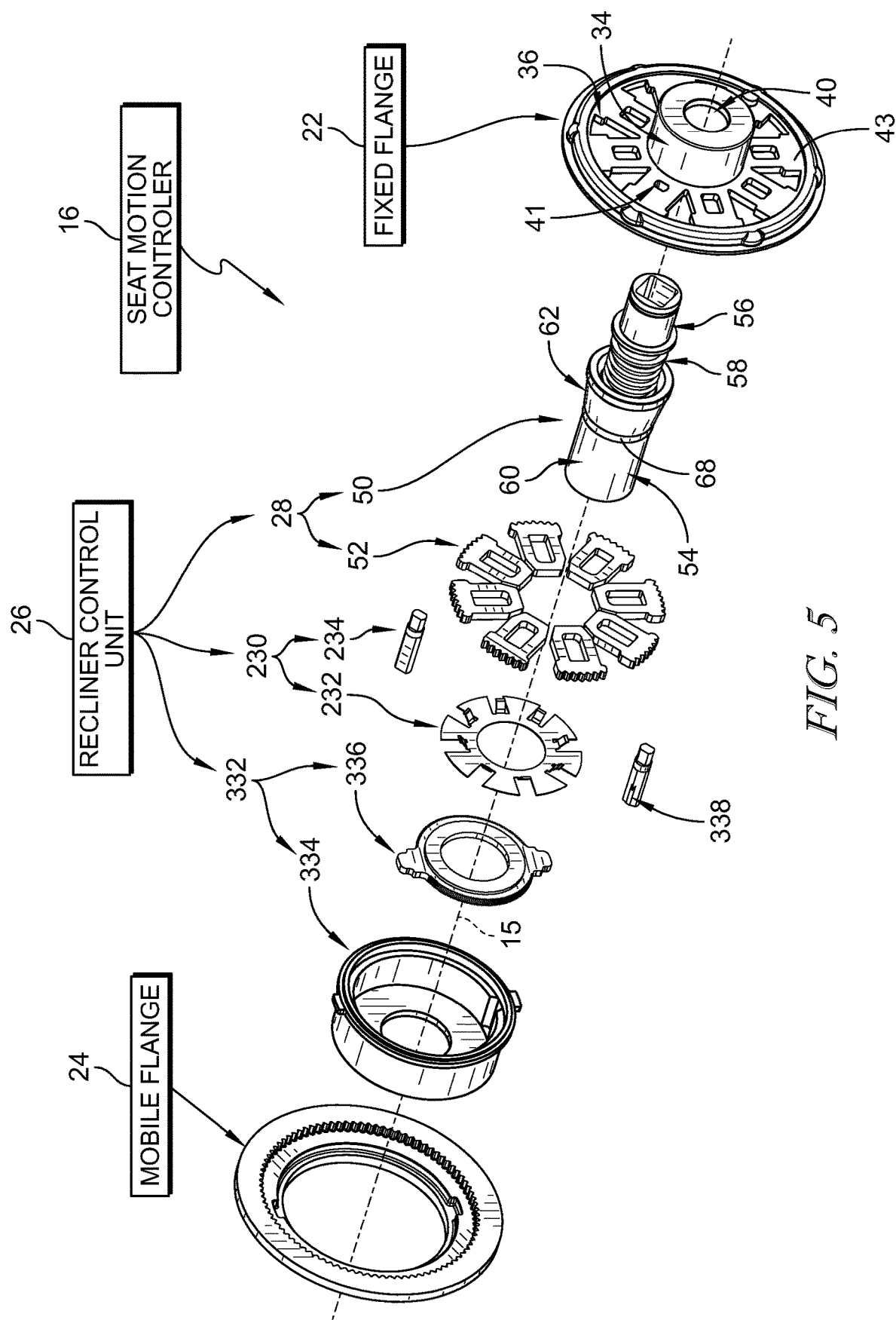
FIG. 5 is an exploded view of the seat-motion controller showing that the seat-motion controller unit includes, from right to left, a fixed flange configured to couple to the seat bottom, a recliner control unit configured to control movement of the seat back relative to seat bottom, and a mobile flange coupled to the seat back and configured to rotate about the seat-back pivot axis relative to the fixed flange, and further showing that the recliner control unit includes a mode controller configured to move the seat back in the fine-adjustment mode and the gross-movement mode, a paw retainer configured to cooperate with the mode controller to reduce undesirable noise and tactile sensations when the occupant support is moved in the gross-movement mode, and a memory-return controller configured to block the occupant support from moving from the gross-movement mode to the fine-adjustment mode unless the seat back is in the selected memory position.

Occupant support 10 includes a seat bottom 12, a seat back 14, and a seat-motion controller 16 as shown in FIGS. 1 and 5. Seat bottom 12 is coupled to a floor 13 of vehicle 11 for movement therewith. Seat back 14 is coupled to seat bottom 12 for movement about a seat-back pivot axis 15 relative to seat bottom 12 between the upright position and the folded-forward position. Seat-motion controller 16 is configured to provide means for controlling movement of seat back 14 about seat-back pivot axis 15 relative to seat bottom 12.

Seat-motion controller 16 configured to move occupant support 10 in one of the fine-adjustment mode and the gross adjustment mode as suggested in FIGS. 1-3. In the fine-adjustment mode, seat-motion controller 16 pivots seat back 14 about seat-back pivot axis 15 relative to seat bottom 12 in response to power being supplied to seat-motion controller 16 and seat-motion controller 16 blocks seat back 14 from rotating relative to seat bottom 12 while power is not supplied to seat-motion controller 16 to lock seat back 14 in a selected memory position relative to seat bottom 12. In the gross-movement mode, seat-motion controller 16 frees seat back 14 to pivot about seat-back pivot axis 15 relative to seat bottom 12 between the upright position and the folded-forward position in response to folding force $F_F$ applied to seat back 12. Folding force $F_F$ may be applied by an operator of occupant support 10, gravity acting on seat back 14, a bias member coupled to seat back 14, or seat-motion controller 16.

Seat-motion controller 16 includes a fixed flange 22, a mobile flange 24, and a recliner control unit 26 as shown in FIGS. 5-8. Fixed flange 22 is coupled to seat bottom 12 and configured to be blocked from rotating about seat-back pivot axis 15 relative to seat bottom 12. Mobile flange 24 is coupled to seat back 14 and configured to pivot seat back 14 when mobile flange 24 is rotated about seat-back pivot axis 15 relative to fixed flange 22. Recliner control unit 26 includes a mode controller 28 including a cam-shaft assembly 50 that extends into fixed flange 22 and mobile flange 24 and a plurality of pawls 52 arranged circumferentially around cam-shaft assembly 50 and aligned axially with mobile flange 24.

Figure 10:
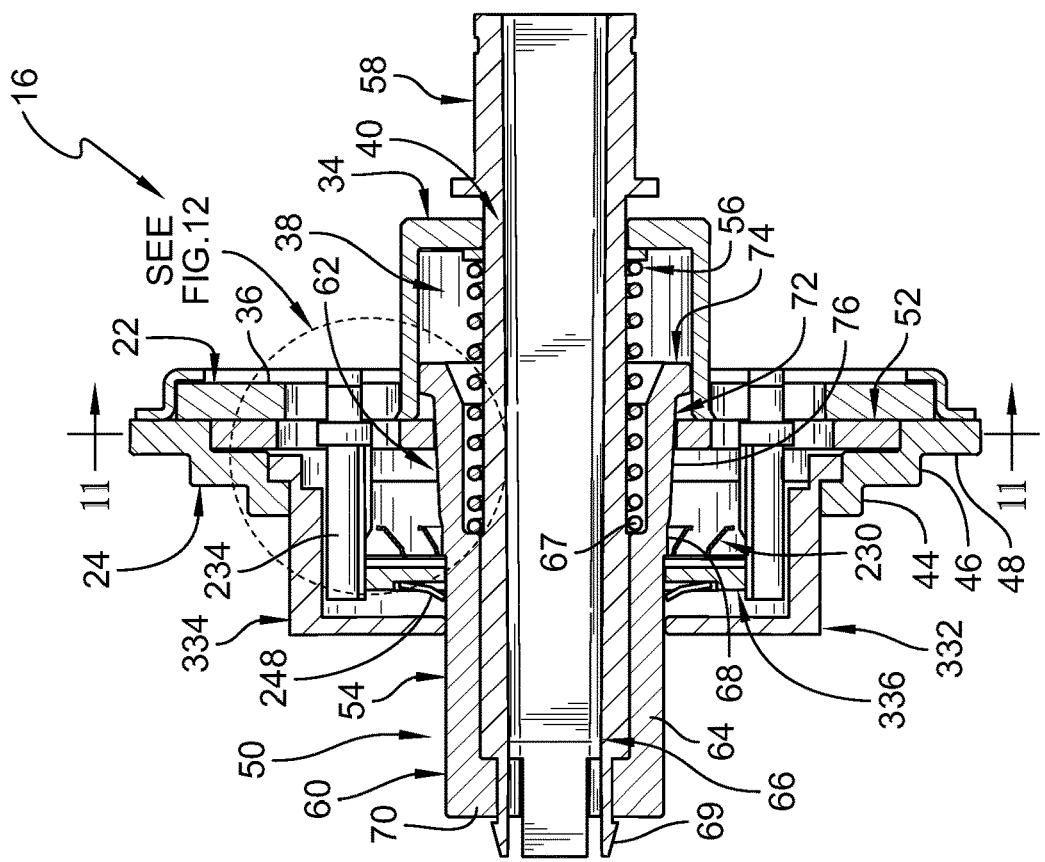
FIG. 10 is a section view of the seat-motion controller showing that the fixed flange and the mobile flange are adjacent one another and the mode controller, pawl retainer, and memory-return controller are located between the fixed flange and the mobile flange and further showing that the cam-shaft assembly is in an extended position to cause a cam included in the cam-shaft assembly to be aligned with the plurality of pawls so that the occupant support is moved in the fine-adjustment mode.
Figure 13:
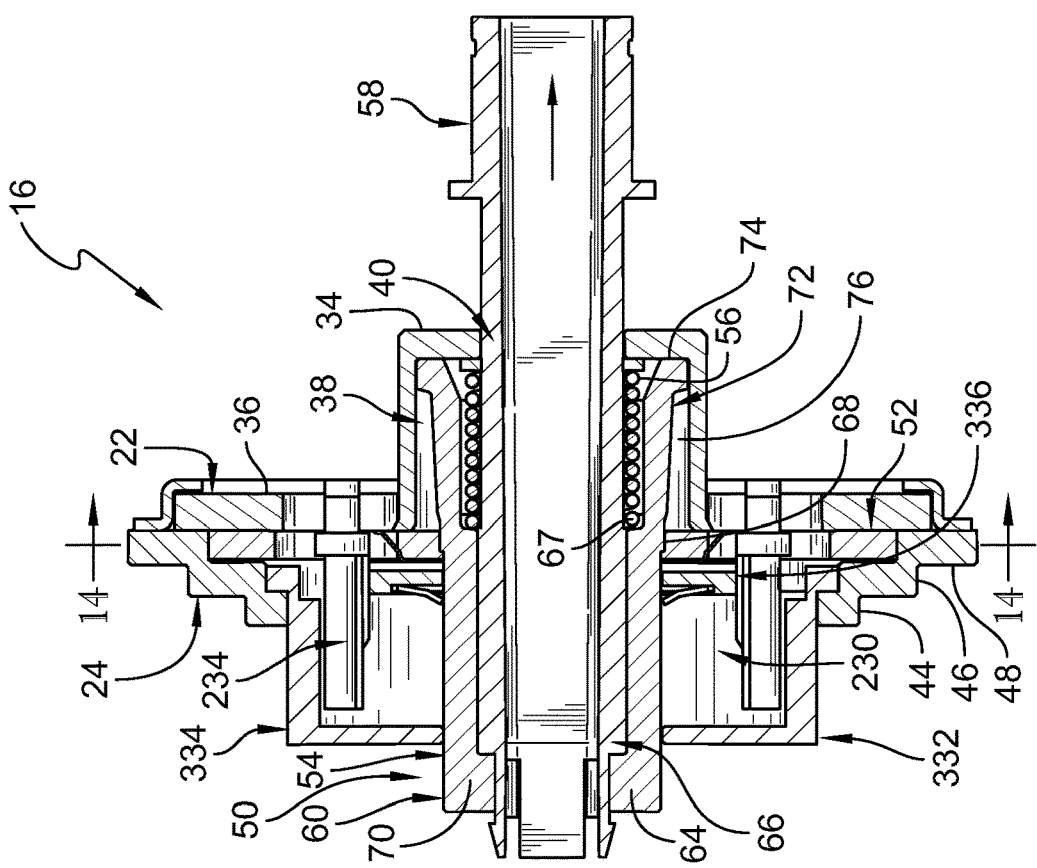
FIG. 13 is a section view of the seat-motion controller after the cam-shaft assembly has been moved along the seat-back pivot axis to cause the occupant support to be movable in the gross-movement mode and showing that a pawl carriage band included in the rotor is aligned axially with the plurality of pawls to allow the plurality of pawls to move radially inward so that the mobile flange is free to rotate relative to the fixed flange.

Cam-shaft assembly 50 is configured to move axially relative to seat-back pivot axis 15 between an extended position and a retracted position to move occupant support 10 in the fine-adjustment mode and the gross-movement mode, respectively as suggested in FIGS. 10 and 13. In the extended position, a cam 62 included in cam-shaft assembly 50 is aligned axially with the plurality of pawls 52 and pushes at least one of the plurality of pawls 52 radially outward away from seat-back pivot axis 15 toward mobile flange 24 so that occupant support 10 may be moved in the fine-adjustment mode. In the retracted position, a central hub 60 included in cam-shaft assmebly 50 is aligned axially with the plurality of pawls 52 to allow the plurality of pawls 52 to move radially inward toward cam-shaft assembly 50 and away from mobile flange 24 so that occupant support 10 may be moved in the gross-movement mode.

Illustratively, cam-shaft assembly 50 is configured to rotate about seat-back pivot axis 15 in response to power being supplied to cam-shaft assembly 50 by a motor 18 as suggested in FIGS. 15-17. As cam-shaft assembly 50 rotates in the extended position, cam 62 pushes the plurality of pawls 52 radially outward in a predetermined sequence so that the plurality of pawls 52 apply a rotational force $F_r$ to mobile flange 24. The rotational force $F_r$ causes mobile flange 24 to rotate about seat-back pivot axis 15 relative to fixed flange 22 and, as a result, seat back 14 pivots relative to seat bottom 12.

In the illustrative embodiment, recliner control unit 26 further includes a pawl retainer 230 coupled to cam-shaft assembly 50 for axial movement therewith as suggested in FIGS. 20-23. Paw retainer 230 is configured to allow radial movement of the plurality of pawls 52 relative to seat-back pivot axis 15 when cam-shaft assembly 50 is in the extended position and to block radial movement of the plurality of pawls 52 relative to seat-back pivot axis 15 when cam-shaft assembly 50 is in the retracted position. Paw retainer 230 blocks the plurality of pawls 52 from interacting with mobile flange 24 when occupant support 10 is moved in the gross-movement mode. As a result, undesirable noise and tactile sensations may be reduced or eliminated when occupant support 10 is moved in the gross-movement mode.

In the illustrative embodiment, recliner control unit 26 further includes a memory-return controller 332 as shown in FIGS. 24-32. Memory-return controller 332 is configured to block cam-shaft assembly 50 from moving from the retracted position to the extended position unless occupant support 10 is in the selected memory position. As a result, occupant support 10 is blocked from being locked in position in the gross-movement mode and is movable or lockable in the fine-adjustment mode when seat back 14 is returned to its previous selected memory position.

Referring now to FIG. 1, occupant support 10 includes seat bottom 12, seat back 14, and seat-motion controller 16. Seat bottom 12 is mounted to floor 13 of vehicle 11 for movement with vehicle 11. Seat back 14 is configured to pivot relative to seat bottom 12 about seat-back pivot axis 15. Seat-motion controller 16 is configured to control movement of seat back 14 to move occupant support 10 between the upright position and the folded-forward position in one of the fine-adjustment mode, the gross-movement mode, and the memory-return mode as suggested in FIGS. 2, 3, and 4.

Seat back 14 may be adjusted for a comfort of an occupant of occupant support 10 when occupant support 10 is in the fine-adjustment mode. In illustrative embodiments, seat back 14 may be adjusted between about 17 degrees and about 45 degrees when occupant support 10 is moved in the fine-adjustment mode.

Seat back 14 may be moved in the gross-movement mode to an easy entry position to allow access behind occupant support 10, for example, to allow a rear passenger to enter vehicle 11. In the illustrative embodiment, seat back 14 may be about parallel with seat bottom 12 when occupant support is in the gross-movement mode.

Figure 6:
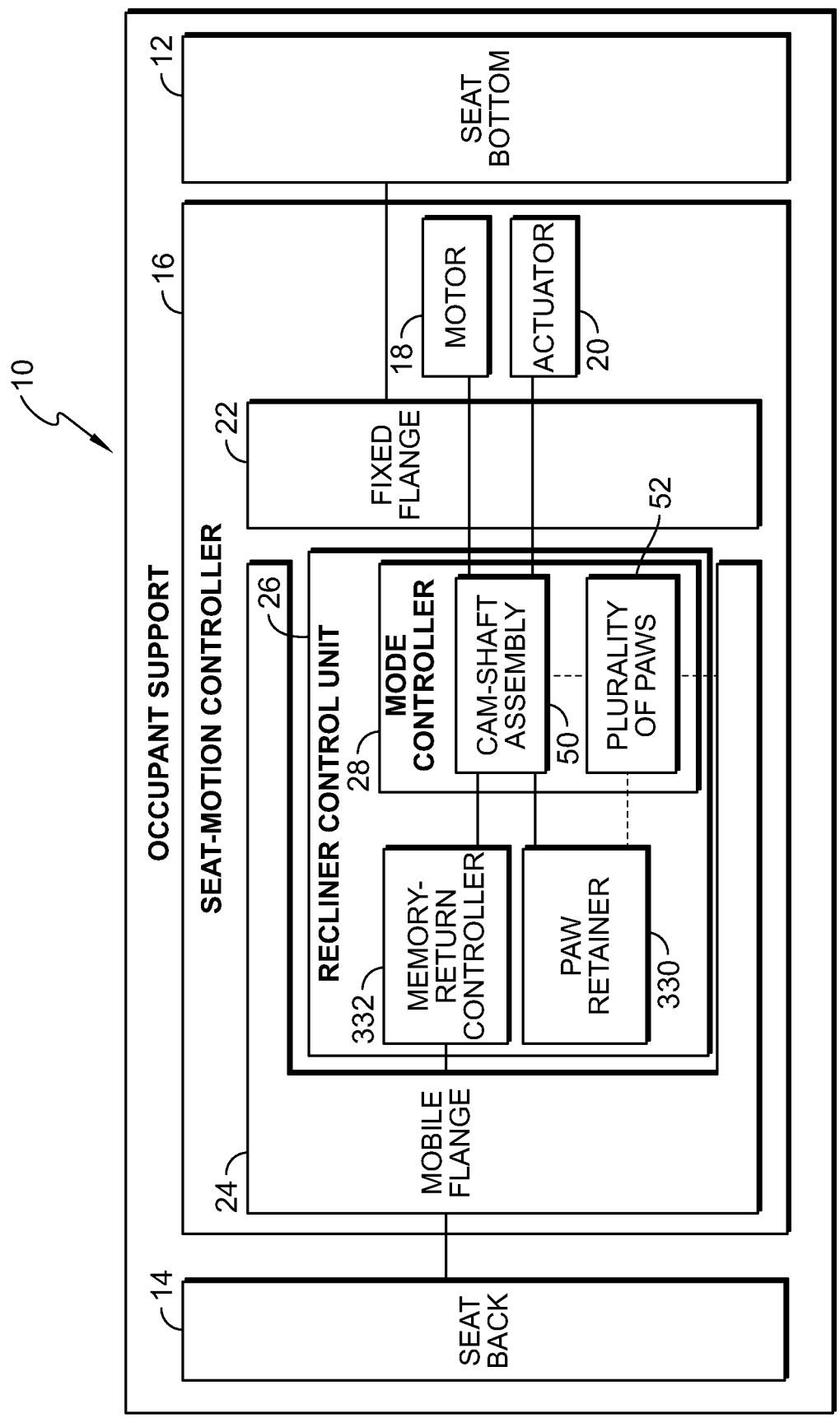
FIG. 6 is a diagrammatic view of the occupant support of FIG. 1 showing that the occupant support includes the seat bottom, the seat back, and the seat-motion controller coupled to the seat bottom and the seat back, and further showing that the seat-motion controller includes the fixed flange, the mobile flange, the recliner control unit configured to move the mobile flange relative to the fixed flange, a motor coupled to a cam-shaft assembly included in the mode controller of the recliner control unit, and an actuator coupled to the cam-shaft assembly, and further showing that the recliner control unit includes the mode controller having the cam-shaft assembly and a plurality of pawls, the pawl retainer, and the memory-return controller.

Seat-motion controller 16 includes fixed flange 22, mobile flange 24, and recliner control unit 26 as suggested in FIGS. 5 and 6. Fixed flange 22 and mobile flange 24 included in seat-motion controller 16 are shown in greater detail without recliner control unit 26 in FIG. 7. Fixed flange 22 is coupled to seat bottom 12 such that fixed flange 22 is blocked from rotating about seat-back pivot axis 15 relative to seat bottom 12. Mobile flange 24 is coupled to seat back 14 and is configured to rotate about seat-back pivot axis 15 relative to fixed flange 22 to cause seat back 14 to pivot relative to seat bottom 12. Recliner control unit 26 controls rotation of mobile flange 24 relative to fixed flange 22. As a result, recliner control unit 26 controls the position of seat back 14 about seat-back pivot axis 15 relative to seat bottom 12.

Illustratively, seat-motion controller 16 further includes motor 18 and an actuator 20 coupled to recliner control unit 26 as shown in FIG. 6. Motor 18 is configured to drive recliner control unit 26. In other embodiments, recliner control unit 26 is manually driven by the operator of occupant support 10, for example, by hand or by a knob. Actuator 20 is configured to move components of recliner control unit 26 to move occupant support 10 between the fine-adjustment mode and the gross-movement mode.

Figure 7:
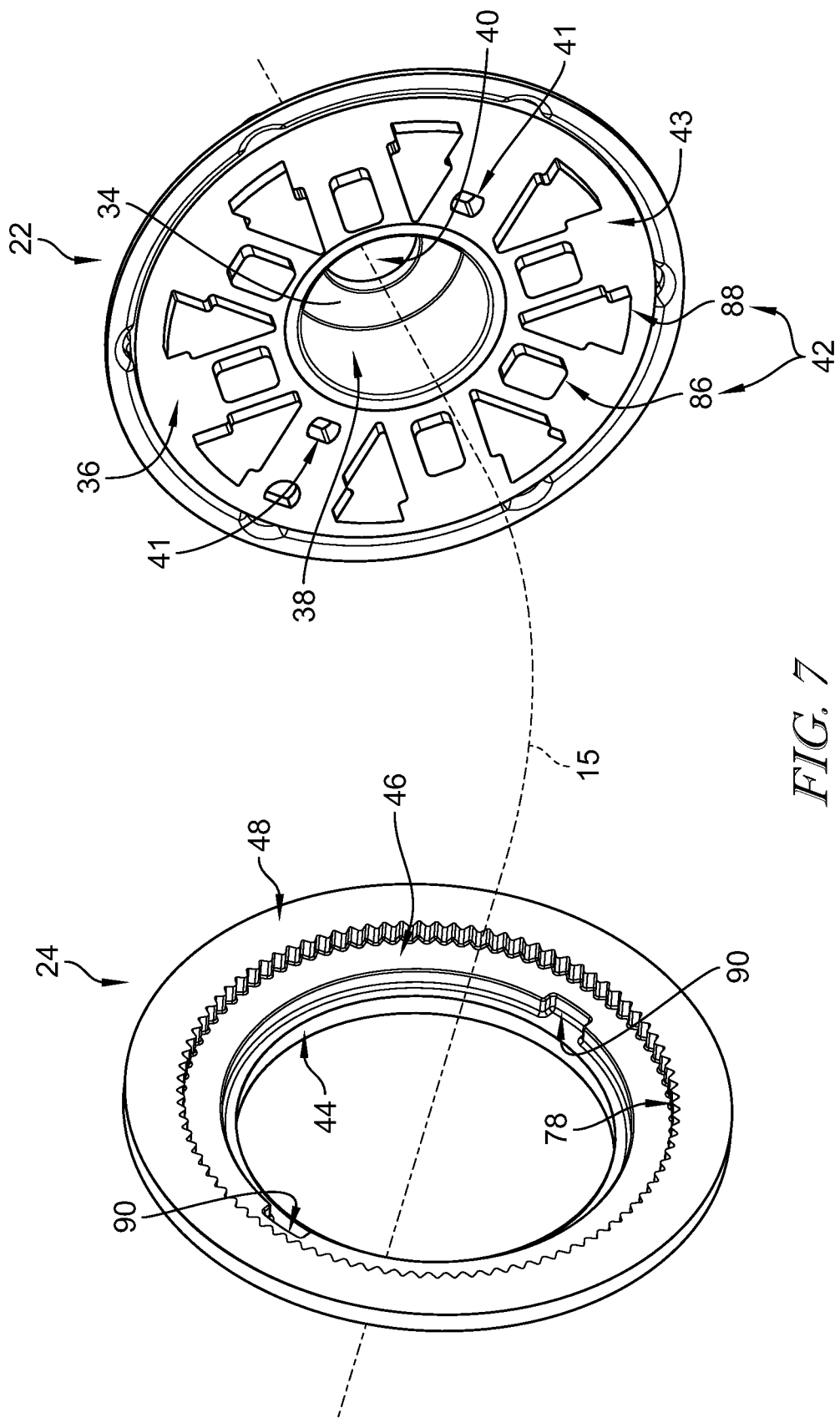
FIG. 7 is a perspective view of the mobile flange and the fixed flange included in the seat-motion controller showing that the mobile flange includes a plurality of radially extending flange teeth configured to mate with pawl teeth included in the plurality of pawls included in the mode controller and that the fixed flange includes rails and guide wedges arranged to limit the plurality of pawls to radially inward and outward movement.

Fixed flange 22 includes a bushing 34 and a static disc 36 as shown in FIGS. 5 and 7. Bushing 34 is arranged circumferentially about seat-back pivot axis 15 and a portion of recliner control unit 26. Static disc 36 extends radially outward away from bushing 34 and is coupled to seat bottom 12. Illustratively, static disc 36 is welded to seat bottom 12. In other embodiments, static disc 36 is coupled to seat bottom 12 by fasteners or any other suitable alternative.

Bushing 34 is formed to define a shaft-unit receiving cavity 38 and a bushing aperture 40 as shown in FIGS. 5 and 7. Shaft-assembly receiving cavity 38 is sized to receive a portion of a cam-shaft assembly 50 included in recliner control unit 26. Bushing aperture 40 is arranged to open into shaft-assembly receiving cavity 38 and allows cam-shaft assembly 50 to extend through fixed flange 22 so that, for example, cam-shaft assembly 50 can be driven by a coupling shaft that is rotated by motor 18 or that is manually by the operator.

Static disc 36 is formed to define pin holes 41 and includes a static-disc body 43 and pawl guides 42 as shown in FIGS. 5 and 7. Each pin hole 41 is sized to receive a corresponding pin 234 that extends axially away from static disc 36. Paw guides 42 extend axially away from static-disc body 43 and are arranged circumferentially about seat-back pivot axis 15 as shown in FIG. 7.

Illustratively, pawl guides 42 include a plurality of rails 86 and a plurality of guide wedges 88. Each rail 86 extend through a corresponding pawl 52 included in a mode controller 28 of recliner control unit 26 to limit movement of pawls 52 as suggested in FIG. 11. Guide wedges 88 are arranged between neighboring pawls 52 to further limit movement of pawls 52.

Mobile flange 24 illustratively includes an inner band 44 arranged circumferentially around seat-back pivot axis 15, an intermediate band 46 arranged circumferentially around inner band 44, and an outer band 48 arranged circumferentially around intermediate band 46 as shown in FIGS. 5 and 7. Inner band 44 and intermediate band 46 couple mobile flange 24 to a memory-return controller 32 included in recliner control unit 26. Intermediate band 46 is formed to include tab receivers 90 that extend radially inwardly into intermediate band 46 and receive guide tabs 358 included in memory-return controller 32. Outer band 48 is formed to include a plurality of radially inwardly extending flange teeth 78 arranged circumferentially about seat-back pivot axis 15.

Recliner control unit 26 includes mode controller 28, pawl retainer 230, and memory-return controller 232 as shown in FIGS. 5 and 6. Mode controller 28 is configured to move occupant support 10 between the fine-adjustment mode and the gross-movement mode and to control the position of occupant support 10. Paw retainer 230 is configured to block interaction of mode controller 28 with mobile flange 24 while occupant support 10 is in the gross-movement mode. Memory-return controller 332 is configured to block occupant support 10 from moving from the gross-movement mode to the fine-adjustment mode until seat back 14 is returned to the preselected position relative to seat bottom 12 when occupant support 10 is moving in the memory-return mode.

Figure 8:
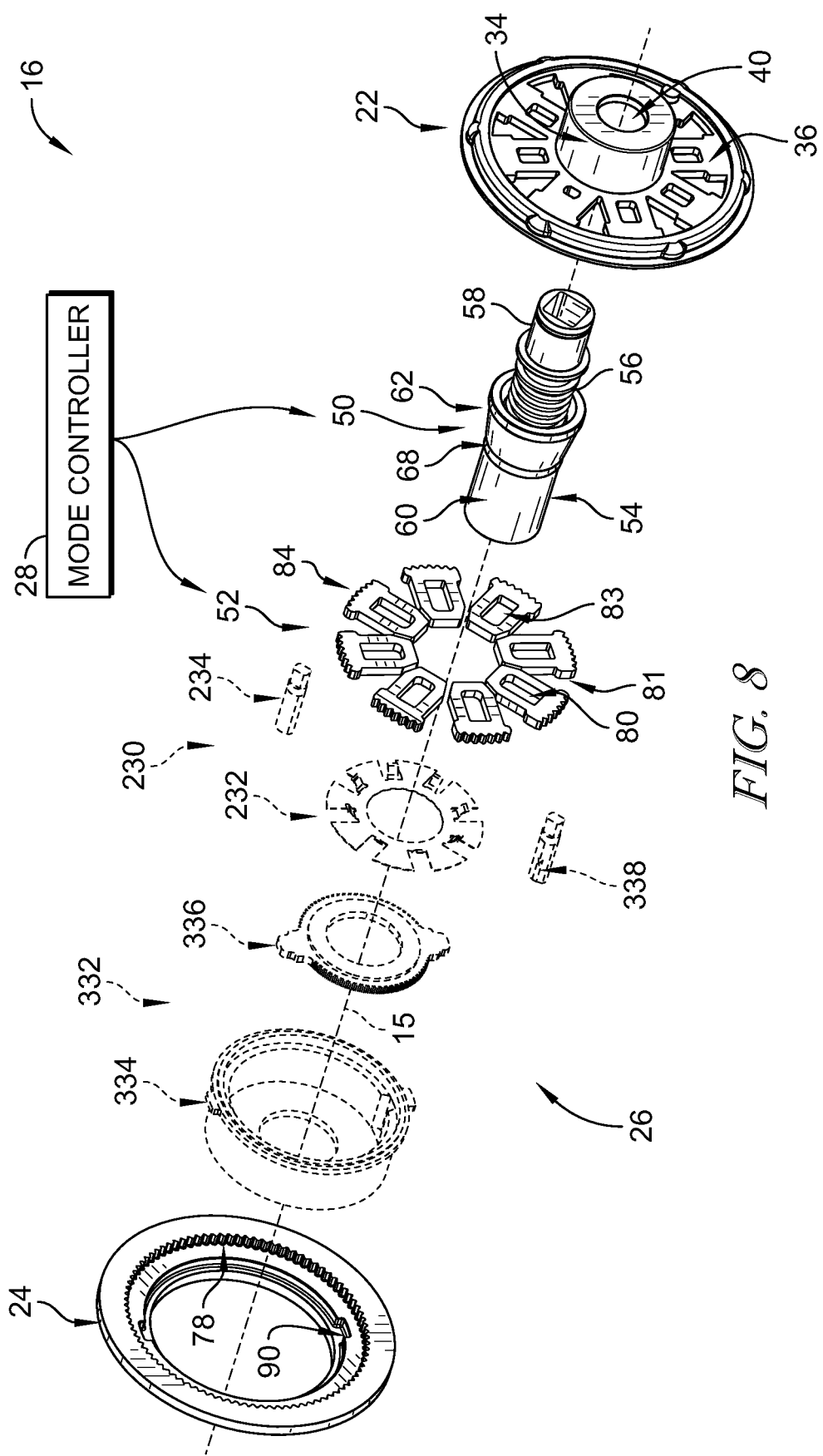
FIG. 8 is a view similar to FIG. 5 suggesting that the mode controller cooperates with the fixed flange and the mobile flange included in the seat-motion controller to move the occupant support in the fine-adjustment mode and the gross-movement mode.

As suggested in FIG. 8, mode controller 28 cooperates with fixed flange 22 and mobile flange 24 to control movement of seat back 14 when occupant support 10 is in the fine-adjustment mode and the gross-movement mode. Mode controller 28 is configured to move between a fine-adjustment arrangement shown in FIGS. 10 and 11 and a gross-movement arrangement shown in FIGS. 13 and 14. Occupant support 10 is movable in the fine-adjustment mode shown in FIG. 2 when mode controller 28 is in the fine-adjustment arrangement. Occupant support 10 is movable in the gross-movement mode shown in FIG. 3 when mode controller 28 is in the gross-movement arrangement.

Figure 9:
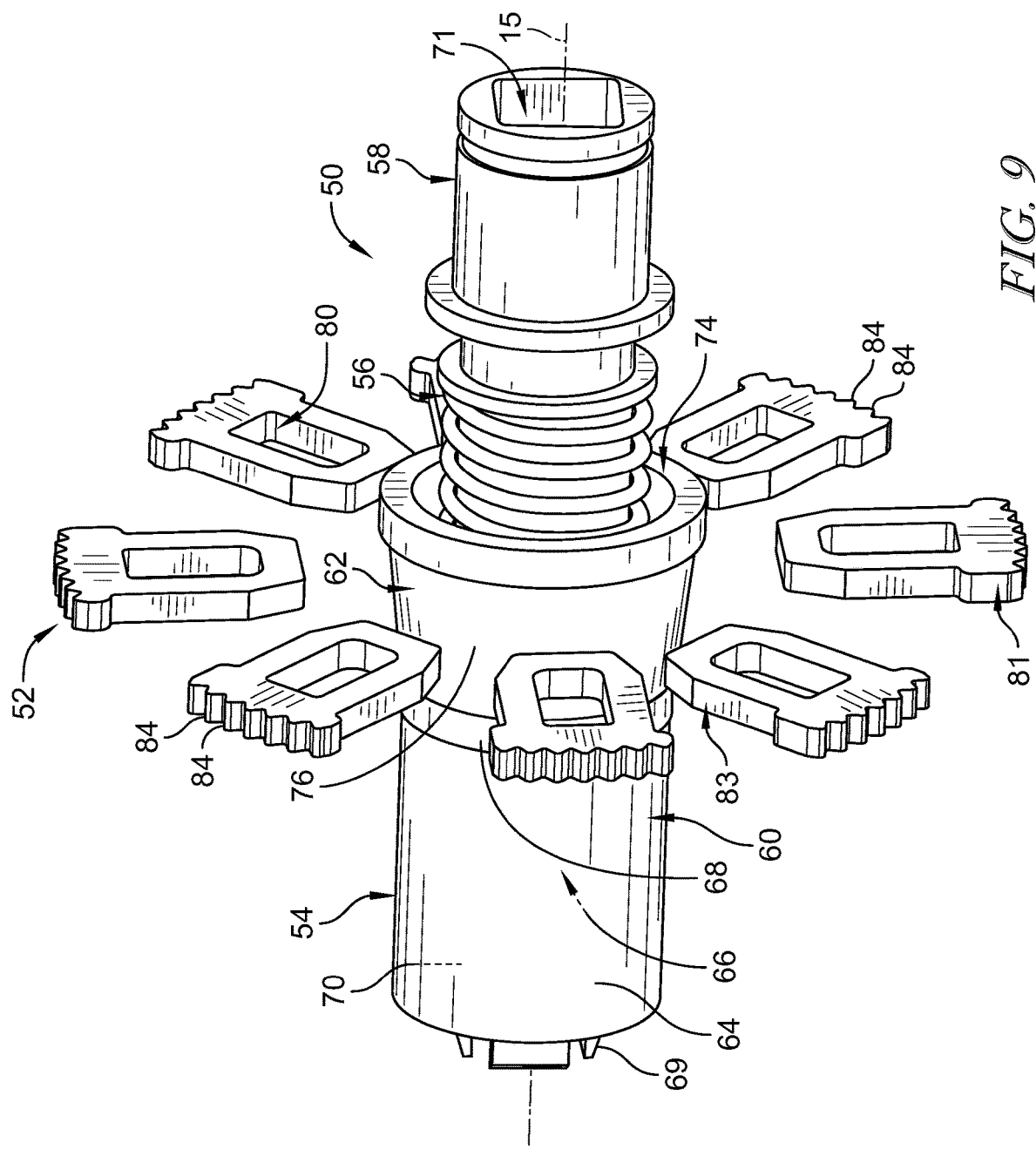
FIG. 9 is a perspective view of the mode controller included in the recliner control unit showing that the mode controller includes the cam-shaft assembly and the plurality of pawls, the cam-shaft assembly extends along the seat-back pivot axis and the plurality of pawls are arranged circumferentially around the cam-shaft assembly, each pawl includes a plurality of radially outwardly extending pawl teeth configured to mate with the flange teeth included in the mobile flange.

Mode controller 28 includes cam-shaft assembly 50 and the plurality of pawls 52 as shown in FIG. 9. Cam-shaft assembly 50 extends along seat-back pivot axis 15 and is configured to move mode controller 28 between the fine-adjustment arrangement and the gross-movement arrangement in response to the operator activating actuator 20. The plurality of pawls 52 are arranged circumferentially about cam-shaft assembly 50 and move radially outwardly and inwardly relative to seat-back pivot axis 15 to selectively block rotation of mobile flange 24, rotate mobile flange 24 incrementally about seat-back pivot axis 15, and allow free rotation of mobile flange 24.

Cam-shaft assembly 50 is coupled to actuator 20 and configured to be moved axially relative to seat-back pivot axis 15 by actuator 20 as suggested in FIG. 6. Cam-shaft assembly 50 is configured to move axially between the extended position shown in FIG. 10 and the retracted position shown in FIG. 13 to move mode controller 28 between the fine-adjustment arrangement and the gross-movement arrangement.

Cam-shaft assembly 50 includes a rotor 54, a bias member 56, and a drive shaft 58 as shown in FIGS. 9 and 10. Rotor 54 is configured to push pawls 52 radially outward toward mobile flange 24 or allow pawls 52 to move radially inward toward seat-back pivot axis 15. Bias member 56 is positioned between rotor 54 and fixed flange 22 and biases rotor 54 away from fixed flange 22 to bias cam-shaft assembly 50 toward the extended position and away from the retracted position as suggested in FIG. 10. Drive shaft 58 is coupled to rotor 54 for axial and rotational movement therewith.

Figure 11:
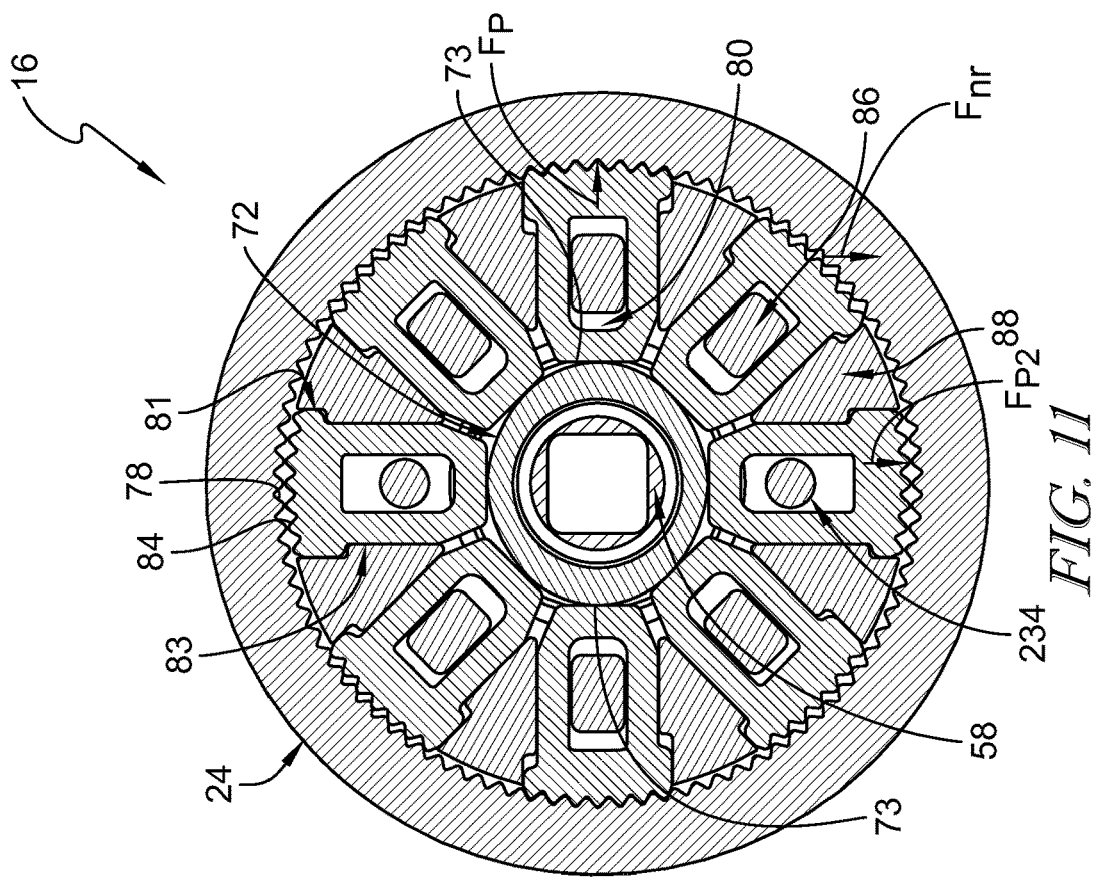
FIG. 11 is a section view of FIG. 10 taken along line 11-11 of FIG. 10 showing that the mobile flange is arranged around the mode controller and that the cam included in the cam-shaft assembly has an eccentric shape configured to push at least one and less than all of the plurality of pawls radially outward into engagement with the mobile flange to lock the seat back in the selected memory position and to cause the pawls to move radially inward and outward in response to rotation of the cam-shaft assembly to cause the mobile flange to rotate about the seat back pivot axis and pivot incrementally the seat back relative to the seat bottom.
Figure 14:
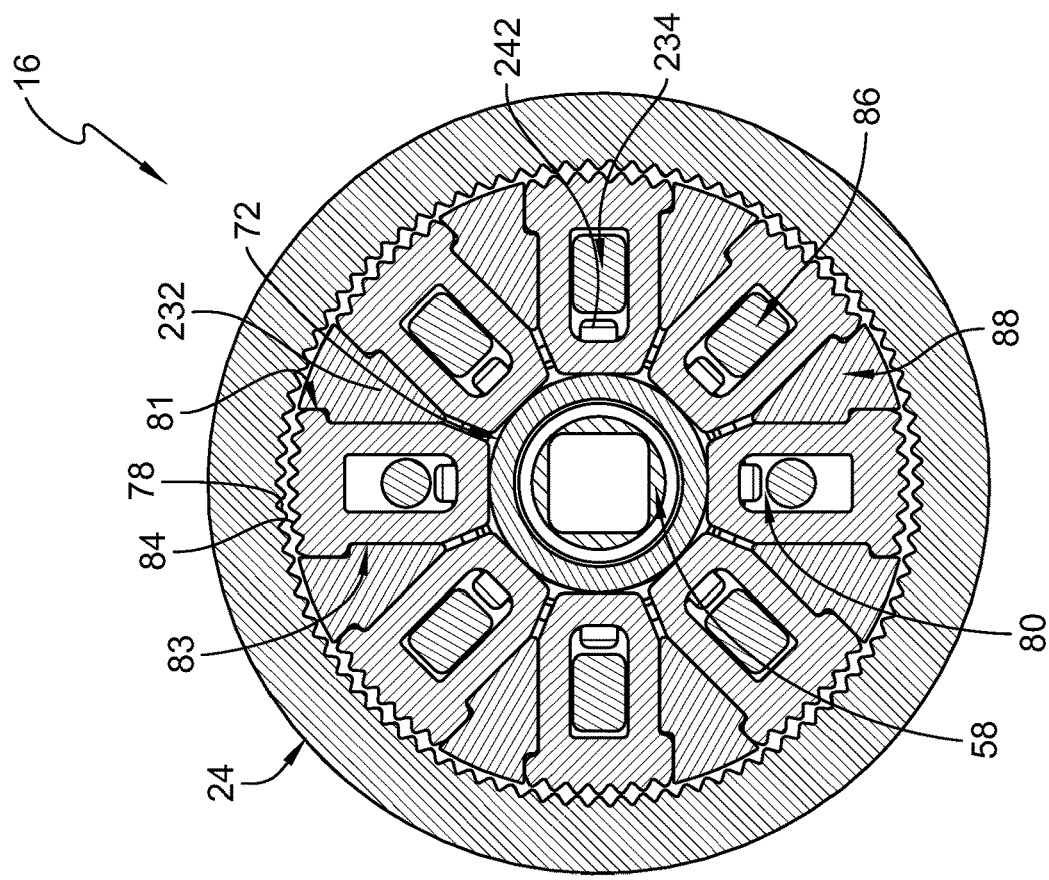
FIG. 14 is a sectional view of the recliner control unit taken along line 14-14 of FIG. 13 showing that the pawl retainer included in the recliner control unit includes a plurality of pawl-retainer tabs that extend into apertures formed in the plurality of pawls to pull the pawls radially inward away from the flange teeth included in the mobile flange and block the plurality of pawls from moving radially outward toward the mobile flange while the occupant support is in the gross-movement mode so that the mobile flange is free to rotate about the seat-back pivot axis without interference with the plurality of pawls.

Rotor 54 is configured to rotate in a clockwise direction and a counter-clockwise direction. Rotor 54 includes central hub 60 and cam 62 as shown in FIGS. 9-14. Central hub 60 extends axially along seat-back pivot axis 15 and has a maximum radius that is smaller than a maximum radius of cam 62. Cam 62 extends radially outward away from central hub 60 toward the plurality of pawls 52. Central hub 60 is aligned axially with pawls 52 when cam-shaft assembly 50 is in the retracted position to provide space for pawls 52 to move radially inward away from mobile flange 24 toward seat-back pivot axis 15 as shown in FIGS. 13 and 14. Cam 62 is eccentric shaped and aligned axially with pawls 52 when cam-shaft assembly 50 is in the extended position and pushes at least one of the pluralities of pawls 52 radially outward toward mobile flange 24 as shown in FIGS. 10 and 11. In the illustrative embodiment, cam 62 pushes at least one and less than all of the plurality of pawls 52 radially outward toward mobile flange 24.

Central hub 60 includes a hub body 64 formed to define a drive-shaft receiving cavity 66, a pawl carriage band 68, and shaft retainers 70 as shown in FIGS. 9 and 10. Hub body 64 is arranged circumferentially about seat-back pivot axis 15 and receives a portion of drive shaft 58 in drive-shaft receiving cavity 66. Hub body 64 further includes an axially facing bias retainer surface 67 arranged to retain bias member 56 in shaft-assembly receiving cavity 38 between rotor 54 and fixed flange 22. Paw carriage band 68 extends radially outward away from hub body 64 to control a radial location of the plurality of pawls 52 while seat-motion controller 16 is in the gross-movement position shown in FIGS. 13 and 14. Paw carriage band 68 has a smaller maximum radius than cam 62 to allow pawls 52 to move radially inward relative to their position when cam 62 is aligned axially with pawls 52. Shaft retainers 70 extend radially inward away from hub body 64 into drive-shaft receiving cavity 66 and couple hub body 64 to shaft guides 69 included in drive shaft 58 for rotation therewith.

Cam 62 includes a cam body 72 and a rotor stop 74 as shown in FIGS. 9 and 10. Cam body 72 pushes the plurality of pawls 52 radially outward when cam-shaft assembly 50 is in the extended position and occupant support 10 is in the fine-adjustment mode. Rotor stop 74 blocks rotor 54 from escaping shaft-assembly receiving cavity 38 formed in bushing 34.

Cam body 72 is coupled to central hub 60 and is arranged circumferentially about bias member 56 and drive shaft 58 as shown in FIGS. 9-11. Cam body 72 has an eccentric, non-circular shape such that cam body 72 pushes at least one of the pluralities of pawls 52 radially outward when cam-shaft assembly 50 is in the extended position as shown in FIG. 11. Illustratively, cam 62 pushes at least one and less than all of the plurality of pawls 52 radially outward. When rotor 54 is not rotating, the at least one and less than all of the plurality of pawls 52 engage mobile flange 24 to block rotation of mobile flange 24. As rotor 54 rotates with drive shaft 58 about seat-back pivot axis 15, the non-circular shape of cam body 72 pushes alternating subsets of pawls 52 radially outward while other subsets of pawls 52 are free to move radially inward. As a result, pawls 52 apply net rotation force $F_{nr}$ to mobile flange 24 that causes mobile flange 24 to rotate about seat-back pivot axis 15.

In some embodiments, cam body 72 has one of an eccentric shape, oval shape, and lobular shape. Illustratively, cam body 72 has an ovular shaped cross-section when viewed along seat-back pivot axis 15 as shown in FIG. 11. Cam body 72 includes peaks 73 defined as the portions of cam body 72 having the largest radius of cam body 72. In the illustrative embodiment, peaks 73 are located on a major axis of ovular shaped cam body 72. Illustratively, cam body 72 pushes two of the plurality of pawls 52 into engagement with mobile flange 24 to cause pawl teeth 84 to mate with flange teeth 78 as shown in FIG. 10. The remaining pawls 52 are partially engaged or disengaged with mobile flange 24 as suggested in FIG. 11. In other embodiments, cam body 72 pushes one or more pawls 52 radially outward into engagement with mobile flange 24.

Figure 12:
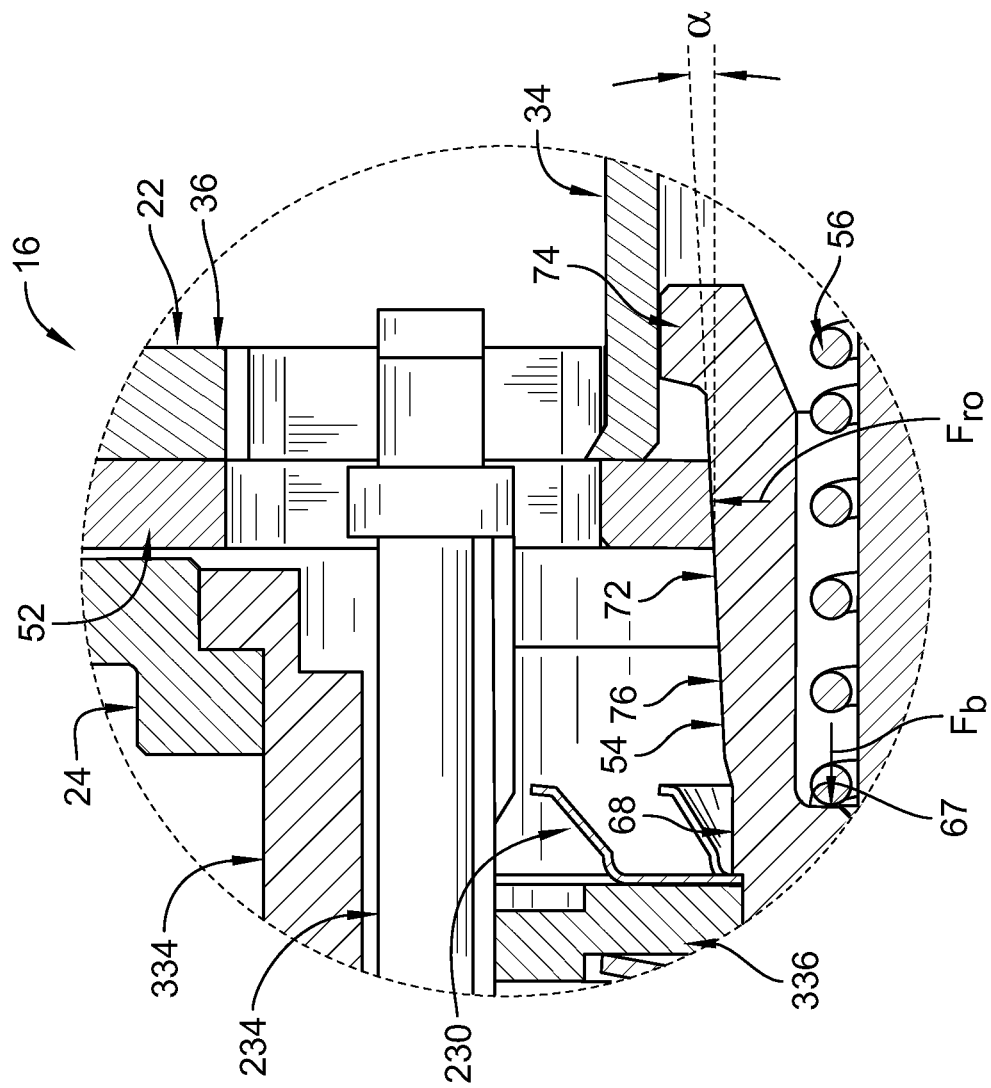
FIG. 12 is an enlarged view of FIG. 10 showing that the cam-shaft assembly includes a rotor having a tapered surface and a bias member that biases the rotor axially toward the mobile flange to cause the tapered surface a to apply a radially outward force to at least one of the plurality of pawls while the occupant support in the fine-adjustment mode so that the pawl teeth included in at least one pawl mates with the flange teeth included in the mobile flange.

Illustratively, cam body 72 has a tapered surface 76 that slopes radially outward as it extends axially away from central hub 60 toward rotor stop 74 as shown in FIGS. 10 and 12. Tapered surface 76 is angled relative to seat-back pivot axis 15 by angle a as shown in FIG. 12. Tapered surface 76 cooperates with bias member 56 to apply a radial outward force $F_{ro}$ onto pawls 52 when cam-shaft assembly 50 is in the extended position. Bias member 56 pushes rotor 54 away from fixed flange 22 and, as a result, tapered surface 76 applies radial outward force $F_{ro}$ onto at least one pawl 52.

In some embodiments, tapered surface 76 may reduce the effects of manufacturing tolerances and wear of the components over time. Bias member 56 pushes rotor 54 axially away from fixed flange 22 as suggested in FIG. 12. Tapered surface 76 pushes pawl 52 increasingly radial outward as rotor 54 moves axially away from fixed flange 22 because of the increasing diameter of tapered surface 76. Eventually, axial movement of rotor 54 is blocked in response to pawls 52 applying a sufficient axial counterforce to rotor 54 to counter a bias force $F_b$ of bias member 56 or in response to rotor stop 74 being blocked by pawl 52.

Rotor stop 74 extends radially outwardly away from cam body 72 as shown in FIGS. 9, 10, and 12. Rotor stop 74 is configured to engage pawls 52 to block rotor 54 from moving axially out of shaft-sssembly receiving cavity 38 away from fixed flange 22 toward mobile flange 24 as a result of bias force $F_b$ applied to rotor 54 by bias member 56. Rotor stop 74 is further configured to engage bushing 34 to limit axial movement of cam-shaft assembly 50 in the opposite direction.

Bias member 56 is configured to apply bias force $F_b$ to rotor 54 and fixed flange 22 to push rotor 54 away from fixed flange 22 as suggested in FIGS. 10 and 12. As a result, cam-shaft assembly 50 is biased toward the extended position and, therefore, seat-motion controller 16 is biased toward the fine-adjustment arrangement. In the illustrative embodiment, bias member 56 comprises a compression spring.

Drive shaft 58 is coupled to motor 18, rotor 54, and actuator 20 as shown in FIG. 6. Motor 18 is configured to selectively rotate drive shaft 58 about seat-back pivot axis 15 as suggested in FIGS. 15-17. In other embodiments, drive shaft 58 is powered by other means such as, for example, manually driven by the occupant. Drive shaft 58 is coupled to rotor 54 to cause rotor 54 to rotate with drive shaft 58 about seat-back pivot axis 15. In the illustrative embodiment, drive shaft 58 includes shaft guides 69 and a keyed cutout 71 configured to receive a coupling shaft or output shaft of motor 18. In some embodiments, drive shaft 58 includes a collar configured to couple to a pull chord.

Each pawl 52 includes a head 81 having a plurality of pawl teeth 84 and a pawl body 83 formed to include a pawl-guide slot 80 as shown in FIGS. 9-11. Paw teeth 84 included in heads 81 are adapted to engage and disengage flange teeth 78 included in outer band 48 of mobile flange 24 to control movement of mobile flange 24 when seat-motion controller 16 is in the fine-adjustment arrangement. Heads 81 are spaced apart from mobile flange 24 when seat-motion controller 16 is in the gross-movement arrangement to allow mobile flange 24 to freely rotate relative to fixed flange 22. In the fine-adjustment arrangement, bodies 83 are pushed radially outward sequentially toward outer band 48 by cam 62 as rotor 54 rotates about seat-back pivot axis 15 to cause mobile flange 24 to rotate.

Head 81 of each pawl 52 is positioned radially outward and adjacent outer band 48 included in mobile flange 24 as shown in FIGS. 9 and 11. Each head 81 extends circumferentially beyond its corresponding body 83. Guide wedges 88 are shaped to limit each head 81 to radial movement and to block heads 81 from moving radially inward beyond a predetermined diameter. Paw teeth 84 extend radially outward toward outer band 48 of mobile flange away from seat-back pivot axis 15 and are adapted to mate with flange teeth 78 of mobile flange 24 as suggested in FIGS. 11 and 15-17.

Each body 83 extends radially inward toward seat-back pivot axis 15 away from its corresponding head 81 as shown in FIGS. 9 and 11. Each body 83 is located between neighboring guide wedges 88. Guide wedges 88 are shaped to limit each body 83 to radial movement. Each pawl-guide slot 80 receives a corresponding rail 86 included in fixed flange 22 or a pin 234 coupled to fixed flange 22. Rails 86 and pins 234 further limit bodies 83 to radial movement relative to seat-back pivot axis 15.

In the illustrative embodiment, the plurality of pawls 52 includes eight pawls 52. In other embodiments, the plurality of pawls 52 includes between three and eleven pawls 52. In some embodiments, the plurality of pawls 52 includes three pawls 52. In some embodiments, the plurality of pawls 52 includes four pawls 52. In some embodiments, the plurality of pawls 52 includes six pawls 52.

FIGS. 10-12 and 15-17 show operation of seat-motion controller 16 in the fine-adjustment arrangement. In the fine-adjustment arrangement, cam-shaft assembly 50 is in the extended position such that cam 62 included in rotor 54 is aligned axially with pawls 52 as shown in FIG. 10. When power is not provided to drive shaft 58, drive shaft 58 is blocked from rotating about seat-back pivot axis 15. Peaks 73 of cam 62 push at least one pawl 52 radially outward so that pawl teeth 84 of the at least one pawl 52 mate with flange teeth 78 included mobile flange 24. As a result, mobile flange 24 is blocked from rotating about seat-back pivot axis 15 and, thus, seat back 14 is locked in the selected memory position and is blocked from pivoting about seat-back pivot axis 15 relative to seat bottom 12.

When the operator desires to adjust incrementally the orientation of seat back 14 relative to seat bottom 12 in the fine-adjustment mode shown in FIG. 2, a user input may be applied to occupant support 10 to cause drive shaft 58 to rotate as suggested in FIGS. 15-17. In the illustrative embodiment, the user input activates motor 18 which powers drive shaft 58. Rotation of drive shaft 58 causes rotor 54 to rotate about seat-back pivot axis 15. As rotor 54 rotates, peaks 73 of cam 62 push pawls 52 radially outward sequentially to cause pawls 52 to apply net rotation force $F_{nr}$ to mobile flange 24 which causes mobile flange 24 to rotate (sometimes called walking mobile flange 24).

Rotation of rotor 54 in a first direction causes rotation of mobile flange 24 in a second direction. Rotation of rotor 54 in third direction opposite the first direction causes rotation of mobile flange 24 in a fourth direction opposite the second direction.

Figure 18:
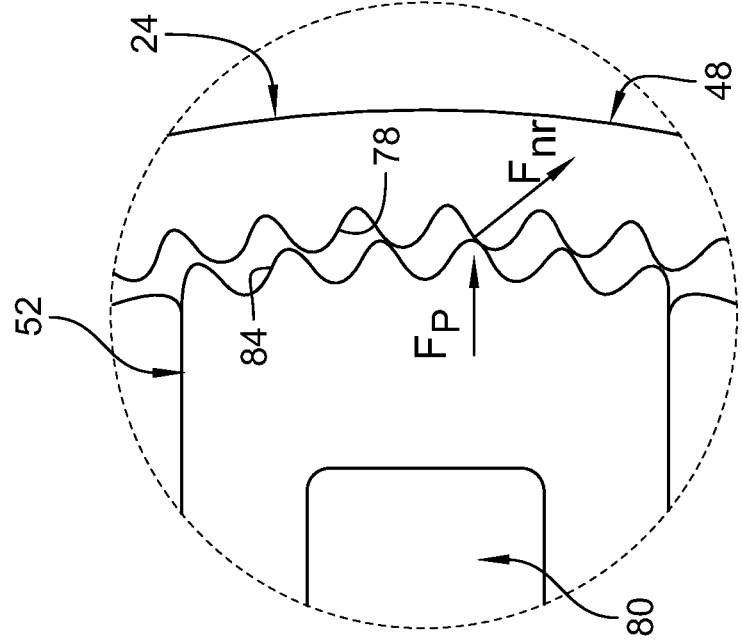
FIG. 18 is an enlarged view of one of the plurality of pawls and the mobile flange and suggesting that the pawl teeth apply a net rotation force to the flange teeth included in the mobile flange in a clockwise direction when the cam-shaft assembly is rotated in a clockwise direction.

Paws 52 aligned with peaks 73 that are fully engaged with mobile flange 24 apply a radially outward force $F_P$ to mobile flange as suggested in FIG. 11. Paws 52 that are beginning to be pushed into engagement with mobile flange 24 as peaks 73 of cam 62 begin to align with those pawls 52 apply net rotational force $F_{nr}$ to mobile flange 24 as shown in FIGS. 11 and 15-17. Net rotational force $F_{nr}$ may be normal to the mating surfaces of pawl teeth 84 and flange teeth 78 as shown in FIG. 18. Net Rotational force $F_{nr}$ causes mobile flange 24 to rotate about seat-back pivot axis 15 incrementally as suggested in FIGS. 15-17. Paws 52 that are misaligned with peaks 73 may apply a radially outward force $F_{P2}$ to mobile flange 24 or may apply no forces to mobile flange 24.

The number of pawl teeth 84 and/or flange teeth 78 control a transmission ratio of seat-motion controller 16 defined by a degree of rotation of cam 62 and a degree of rotation of mobile flange 24. In some embodiments, seat-motion controller 16 has a transmission ratio of about 89:1. That is, about 89 degrees of cam 62 rotation drives about 1 degree of rotation of mobile flange 24. In one such embodiment, mobile flange 24 includes eighty-nine flange teeth 78. The transmission ratio may be changed by varying the number of pawl teeth 84 and/or flange teeth 78. In some embodiments, the transmission ratio is between 200:1 and 20:1.

Figure 19:
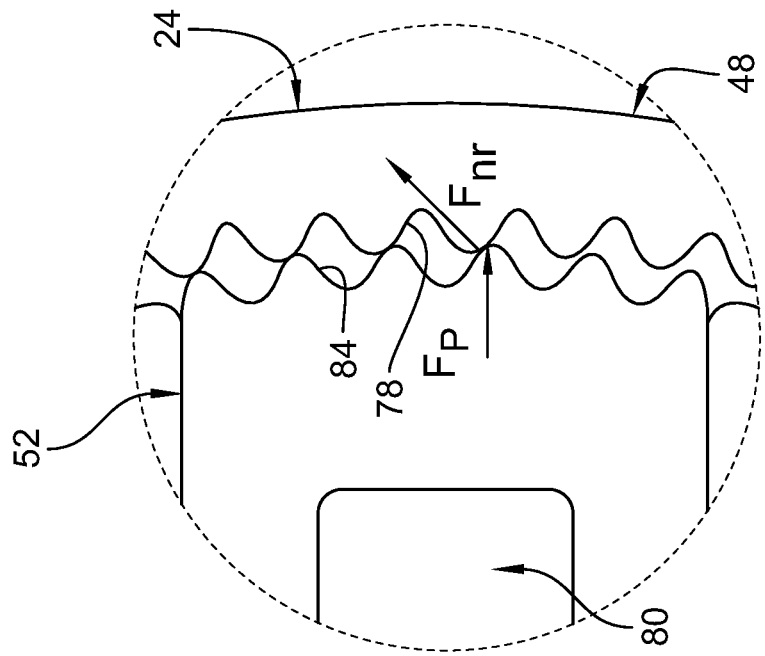
FIG. 19 is a view similar to FIG. 18 of another embodiment of the seat-motion controller suggesting that the number of pawl teeth and flange teeth have been selected to cause the pawl teeth included in the pawls to apply the net rotation force to the flange teeth included in the mobile flange in a counterclockwise direction when the cam-shaft assembly is rotated in a clockwise direction.

As suggested in FIGS. 18 and 19, one or more of the number of pawls 52, the angle of pawls 52, the number of pawl teeth 84 included in each pawl 52, and the number of flange teeth 78 included in mobile flange 24 control the rotation direction of mobile flange 24. In the illustrative embodiment, clockwise rotation of cam 62 causes pawl teeth 84 to apply outward force $F_P$ to cause net rotation force $F_{nr}$ on mobile flange 24 in a clockwise direction as shown in FIG. 18. In other embodiments, net rotation force $F_{nr}$ is applied to mobile flange 24 in a counter-clockwise direction as a result of clockwise rotation of cam 62 as suggested in FIG. 19.

In one example, the plurality of pawls includes 3 pawls. Spacing the pawls apart from one another by about 58.67 degrees causes the mobile flange 24 to rotate in a first direction when cam-shaft assembly 50 rotates in the clockwise direction. Spacing the pawls apart from one another by about 61.34 degrees causes the mobile flange 24 to rotate in a second direction opposite the first direction when cam-shaft assembly 50 rotates in the clockwise direction. In one embodiment, the plurality of pawls 52 includes 4 pawls that are spaced apart from one another by about 90 degrees.

FIGS. 13 and 14 show seat-motion controller 16 in the gross-movement arrangement in which occupant support 10 moves in the gross-movement mode shown in FIG. 3. In the gross-movement mode, seat back 14 is free to pivot about seat-back pivot axis 15 relative to seat bottom 12 from the selected memory position to a plurality between and including the upright position and the folded-forward position in response to folding force $F_F$ applied to seat back 14. As a result, an area behind occupant support 10 may be accessed by the operator or a passenger of vehicle 11. After the area behind occupant support 10 is accessed, seat back 14 may be returned to the selected memory position and locked in place as seat-motion controller automatically moves from the gross-movement arrangement to the fine-adjustment arrangement due to bias force $F_b$.

In the illustrative embodiment, folding force $F_F$ is applied to seat back 14 by the operator. In some embodiments, motor 18 is configured to power seat-motion controller 16 in the gross-movement mode to rotate mobile flange 24 and cause seat back 14 to pivot. In some embodiments, a bias member applies folding force $F_F$ to seat back 14. In some embodiments, gravity applies folding force $F_F$ to seat back 14.

To move seat-motion controller 16 from the fine-adjustment arrangement to the gross-movement arrangement, cam-shaft assembly 50 is moved axially from the extended position shown in FIG. 10 to the retracted position shown in FIG. 14. In the illustrative embodiment, cam-shaft assembly 50 is moved axially to the retracted position in response to activation of actuator 20. In some embodiments, actuator 20 includes a chord coupled to drive shaft 58 of cam-shaft assembly 50. Actuator 20 may be a linear actuator configured to move the chord or may be a user activated actuator 20 configured to move the chord. In other embodiments, actuator 20 is configured to push cam-shaft assembly 50 from the extended position to the retracted position. In some embodiments, actuator 20 comprises a lever configured to be moved by the operator.

When cam-shaft assembly 50 is in the retracted position, central hub 60 included in rotor 54 is axially aligned with the plurality of pawls 52 as shown in FIGS. 13 and 14. Paws 52 are free to move radially inward toward seat-back pivot axis 15 because central hub 60 has a smaller maximum radius as compared to cam 62. As a result, mobile flange 24 is free to rotate about seat-back pivot axis 15 relative to fixed flange 22 because pawls 52 are disengaged from mobile flange 24 and/or move radially inward to allow mobile flange 24 to rotate. In some embodiments, cam-shaft assembly 50 is located in the retracted position so that seat-motion controller 16 is blocked in the gross-movement arrangement. In some such embodiments, the occupant support 10 is movable only in the gross-movement mode.

Seat-motion controller 16 is biased toward the fine-adjustment arrangement as suggested in FIG. 10. In the illustrative embodiment, seat-motion controller 16 is blocked from moving from the gross-movement arrangement to the fine-adjustment arrangement by memory-return controller 332 until seat back 14 is returned to the selected memory position as suggested in FIGS. 25-34. In other embodiments, bias force $F_b$ moves seat-motion controller 16 from the gross-movement arrangement to the fine-adjustment arrangement in response to any counter force being removed. As one example, bias force $F_b$ moves seat-motion controller 16 to the fine-adjustment arrangement in response to power no longer being supplied to actuator 20. As another example, bias force $F_b$ moves seat-motion controller 16 to the fine-adjustment arrangement in response to the operator releasing a manual input to actuator 20 such as, for example, a pull chord.

Actuator 20 is configured to selectively overcome bias force $F_b$ applied to rotor 54 by bias member 56 to move drive shaft 58 axially and, thus, move cam-shaft assembly 50 from the extended position to the retracted position. In the illustrative embodiment, cam-shaft assembly 50 is blocked from moving from the retracted position to the extended position if seat back 14 is not in the selected memory position. As such, bias force $F_b$ and actuator 20 are blocked from moving cam-shaft assembly 50 to the extended position.

In some embodiments, for example, in embodiments, where recliner control unit 26 lacks memory-return controller 332, cam-shaft assembly 50 is free to move from the retracted position to the extended position if seat back 14 is not in the selected memory position. In such embodiments, bias force $F_b$ or actuator 20 may move cam-shaft assembly 50 from the retracted position to the extended position.

In yet other embodiments, cam-shaft assembly 50 is blocked from moving out of the extended position. As such, occupant support 10 is movable in the fine-adjustment mode and seat-motion controller 16 is blocked from moving occupant support 10 in the gross-movement mode.

Figure 20:
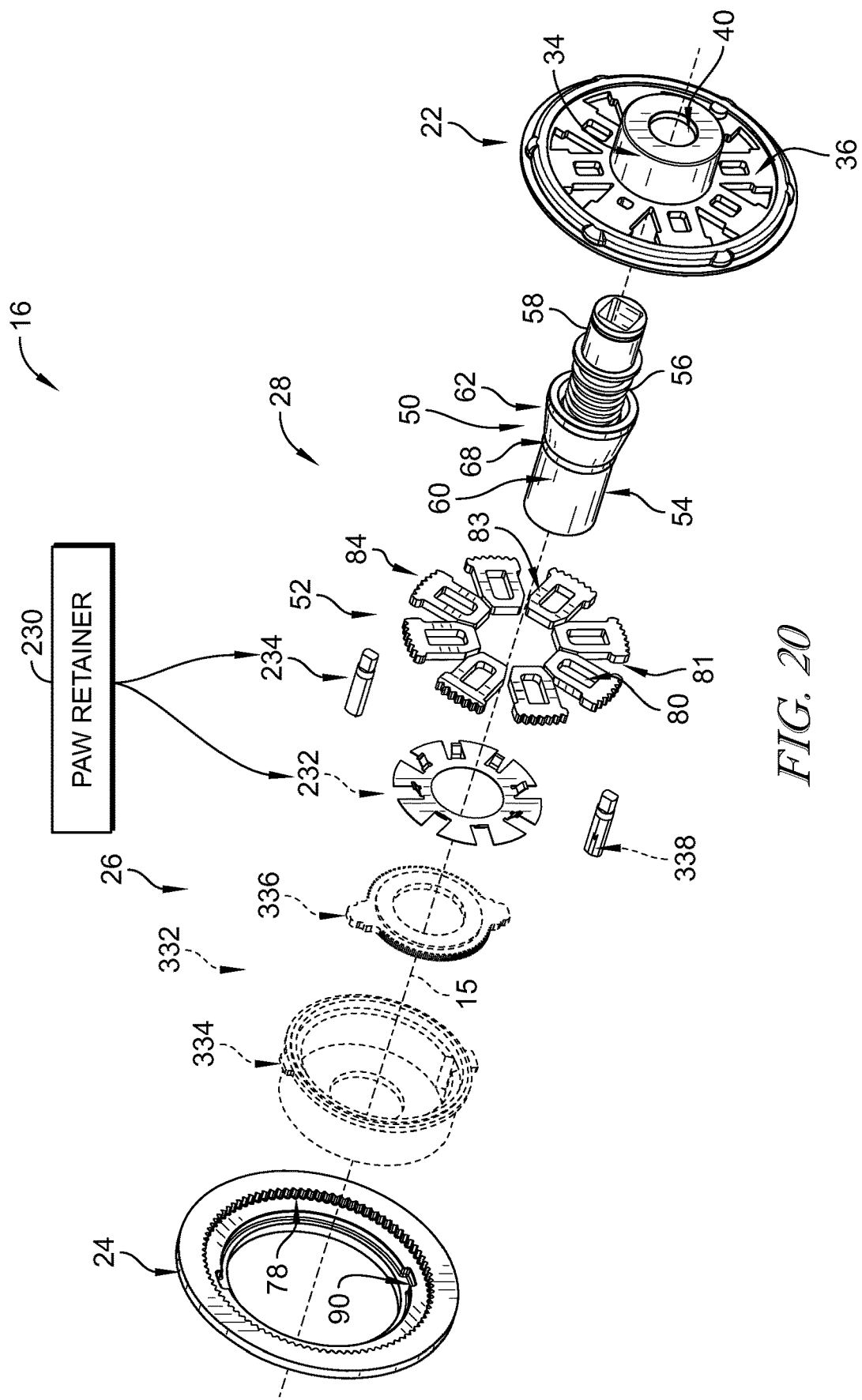
FIG. 20 is a view similar to FIG. 5 suggesting that the illustrative recliner control unit further includes the pawl retainer and that the pawl retainer cooperates with the fixed flange, the mode controller, and the mobile flange when the occupant support is moved in the gross-movement mode.

In the illustrative embodiment, recliner control unit 26 further includes pawl retainer 230 as shown in FIG. 20. Paw retainer 230 cooperates with mode controller 28 and may reduce or eliminate interaction (sometimes called ratcheting) between mobile flange 24 and pawls 52 when seat-motion controller 16 is in the gross-movement mode.

Figure 21:
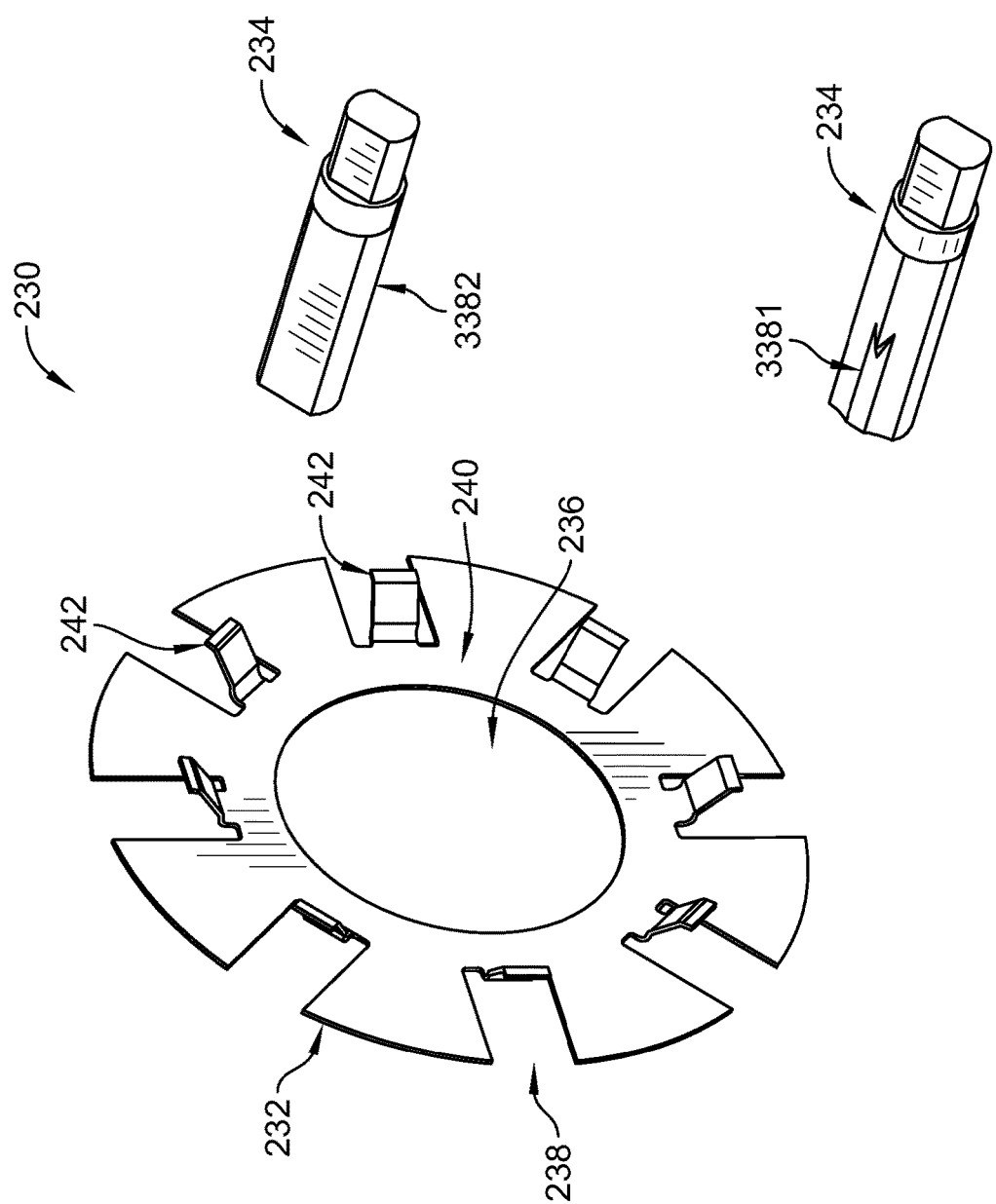
FIG. 21 is a perspective view of the pawl retainer included in the recliner control unit showing that the pawl retainer includes a retainer mask and a plurality of pins, the retainer mask having the plurality of pawl-retainer tabs configured to engage the plurality of pawls and block radial outward movement of the plurality of pawls while the occupant support is moved in the gross-movement mode, and the pair of pins are configured to couple to the fixed flange and block rotation of the retainer mask about the seat-back pivot axis relative to the fixed flange.

Paw retainer 230 includes a mask 232 and pins 234 as shown in FIG. 21. Mask 232 moves pawls 52 radially inward and blocks radial outward movement of pawls 52 when seat-motion controller 16 is in the gross-movement arrangement. Pins 234 block rotation of mask 232 about seat-back pivot axis 15 relative to fixed flange 22. In the illustrative embodiment, pawl retainer 230 may reduce or eliminate undesirable noise and tactile effects caused by pawls 52 interacting with mobile flange 24 when mobile flange 24 rotates while occupant support 10 moves in the gross-movement mode.

Mask 232 is disc shaped and extends circumferentially about seat-back pivot axis 15 as suggested in FIGS. 21. Mask 232 is formed to include a central aperture 236 and pin-retainer slots 238. Central aperture 236 extends through mask 232 and receives rotor 54 included in cam-shaft assembly 50. Pin-retainer slots 238 are configured to receive a corresponding pin 234 to block rotation of mask 232 about seat-back pivot axis 15. In the illustrative embodiment, two of the pin-retainer slots 238 each receive a corresponding pin 234. In other embodiments, one or more of the pin-retainer slots 238 each receive a corresponding pin 234.

Mask 232 further includes mask body 240 and pawl-retainer tabs 242 as shown in FIG. 21. Mask body 240 extends radially outward away from seat-back pivot axis 15. Paw-retainer tabs 242 extend axially away from mask body 240 toward fixed flange 22. Paw-retainer tabs 242 are angled relative to mask body 240 and extend radially outward away from seat-back pivot axis 15. Paw-retainer tabs 242 are spaced apart circumferentially relative to one another about seat-back pivot axis 15. Illustratively, mask 232 includes a number of pawl-retainer tabs 242 equal to a number of pawls 52 included in mode controller 28.

Pins 234 extend into pin holes 41 included in static disc 36 of fixed flange 22 to couple pins 234 to fixed flange 22 as shown in FIG. 22. Pins 234 extend axially through pin-retainer slots 238 formed in mask 232 to engage mask body 240 and block rotation of mask 232 when seat-motion controller 16 is in the fine-adjustment arrangement and the gross-movement arrangement as shown in FIGS. 10, 22, and 23. In the illustrative embodiment, pins 234 act as guide rails similar to rails 86 included in static disc 36 of fixed flange 22 to limit movement of pawls 52. In the illustrative embodiment, pins 234 are coupled to disc teeth 356 included in memory-return controller 332.

Mask 232 is coupled to rotor 54 included in cam-shaft assembly 50 for axial movement with rotor 54 as suggested in FIGS. 10 and 22. Illustratively, mask 232 is coupled to rotor 54 between central hub 60 and a retainer ring 248. Paw-retainer tabs 242 are spaced apart from pawls 52 when seat-motion controller 16 is in the fine-adjustment arrangement shown in FIG. 10. As a result, radial movement of pawls 52 is not blocked by pawl retainer 230, though other components may block radial movement of pawls 52.

When cam-shaft assembly 50 is moved axially into the retracted position to cause seat-motion controller 16 to assume the gross-movement arrangement, mask 232 moves axially with cam-shaft assembly 50 as shown in FIG. 22. As a result, each pawl-retainer tab 242 extends into a corresponding pawl-guide slot 80 formed in each pawl 52 as shown in FIGS. 22 and 23. Paw-retainer tabs 242 move pawls 52 radially inward away from mobile flange 24 and block radial outward movement of pawls 52 toward mobile flange 24. As such, interaction between pawls 52 and mobile flange 24 is blocked to allow mobile flange 24 to rotate freely about seat-back pivot axis 15 without causing undesirable noise or tactile sensations in occupant support 10.

In some embodiments, cam 62 is configured to push all of the plurality of pawls 52 radially outward when cam-shaft assembly 50 is in the extended position. As a result, seat back 14 is blocked from pivoting when occupant support 10 is in the fine-adjustment mode and is free to pivot when occupant support 10 is in the gross-movement mode. In such embodiments, occupant support 10 may be arranged to control movement of seat back 14 when occupant support 10 is in the gross-movement mode.

Figure 24:
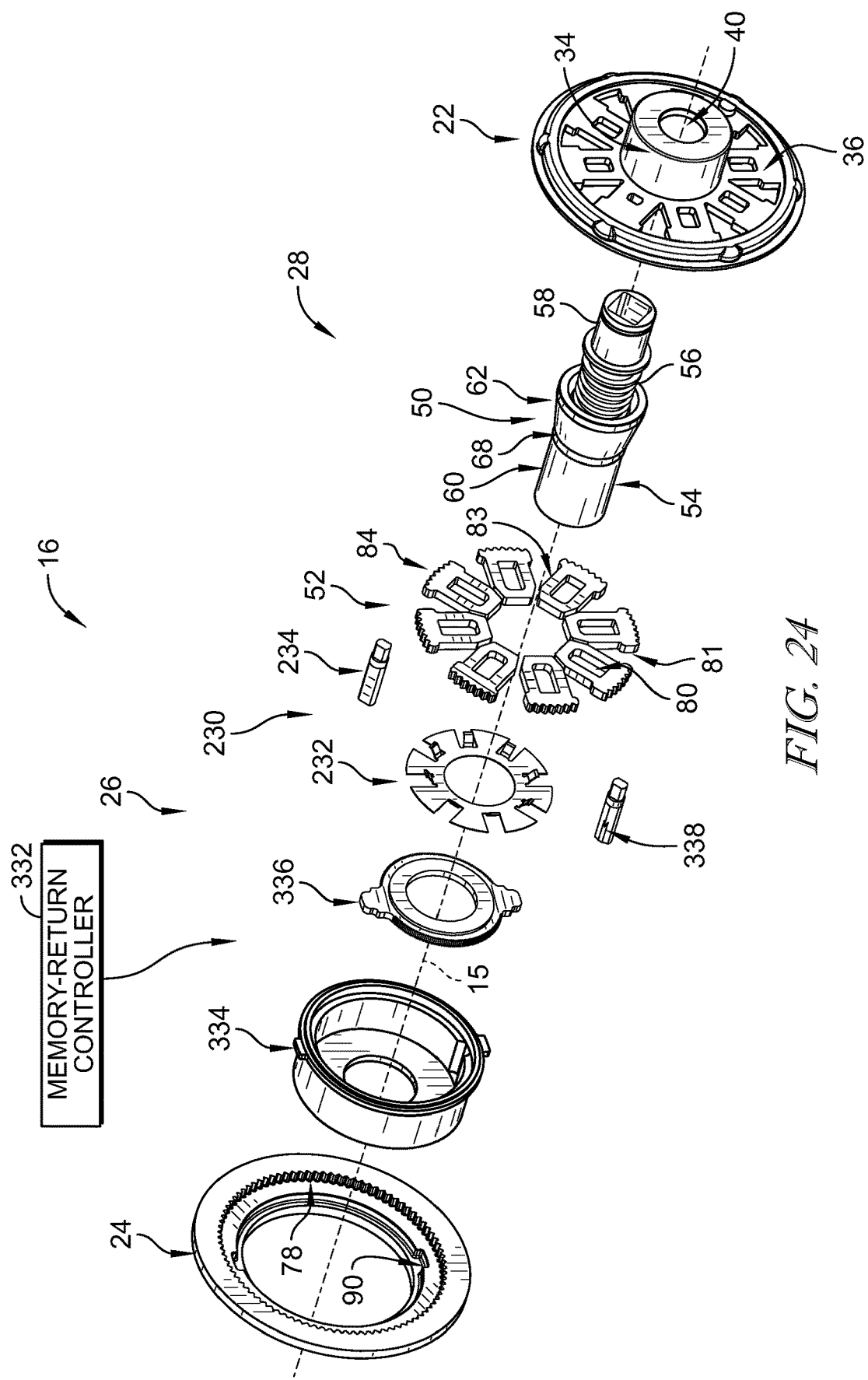
FIG. 24 is a view similar to FIG. 5 suggesting that the illustrative recliner control unit further includes the memory-return controller and that the memory-return controller cooperates with the fixed flange, the mode controller, the pawl retainer, and the mobile flange included in the seat-motion controller to move the occupant support in the memory-return mode and showing that the memory-return controller includes a cover formed to include guide slots, a memory disc, and disc-retainer teeth coupled to the pins included in the pawl retainer, the disc body including a plurality of disc teeth configured to mate with the disc-retainer teeth when the occupant support is in the gross-movement mode.

In the illustrative embodiment, recliner control unit 26 further includes memory-return controller 332 as shown in FIG. 24. Memory-return controller 332 is configured to block occupant support 10 from moving from the gross-movement mode to the fine-adjustment mode until seat back 14 is returned to the selected memory position relative to seat bottom 12 as suggested in FIG. 4. As suggested in FIG. 24, memory-return controller 332 cooperates with fixed flange 22, mobile flange 24, mode controller 28, and pawl retainer 230 while occupant support 10 is moved in the memory-return mode.

Figure 25:
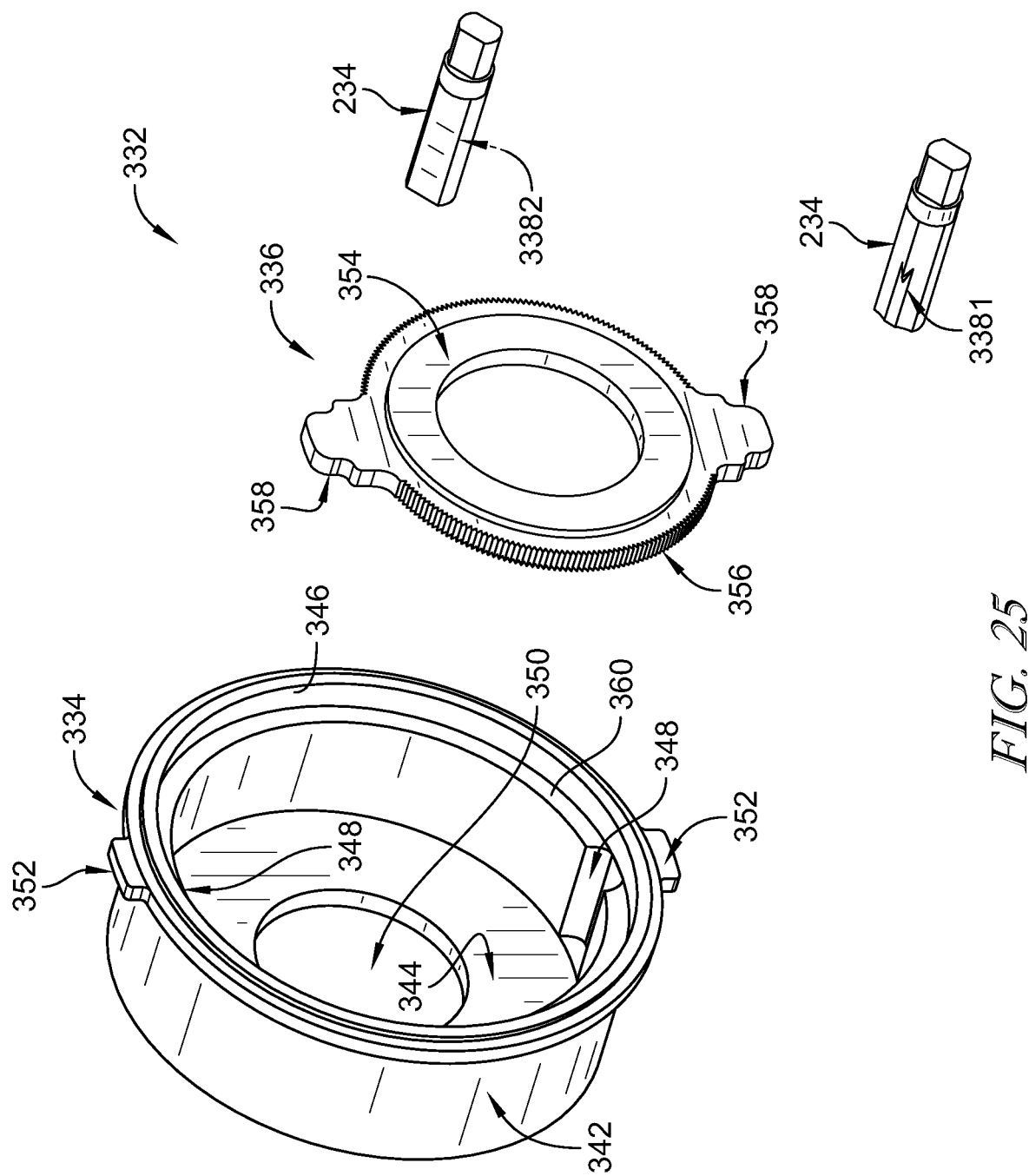
FIG. 25 is an exploded view of the memory-return controller showing that the memory-return controller includes the cover, the memory disc, and the disc-retainer teeth, the cover having a side wall arranged around the seat-back pivot axis and formed to include the guide channels, an end wall coupled to the side wall, and a rim, the memory disc including a disk body, a pair of guide tabs that extend radially from the disc body into the guide channels formed in the cover, and a plurality of radially outward extending disc teeth, and the disc-retainer teeth coupled to the pins and configured to mate with the disc teeth to block rotation of the memory disc when the occupant support is moved in the gross-movement mode.

Memory-return controller 332 includes a cover 334, a memory disc 336, and disc-retainer teeth 338 as shown in FIG. 25. Cover 334 is coupled to mobile flange 24 for rotational movement with mobile flange 24. Memory disc 336 mates with cover 334 for rotation therewith when seat-motion controller 16 is in the fine-adjustment arrangement and is blocked from rotating with cover 334 until seat back 14 returns to the selected position when seat-motion controller 16 is in the gross-movement arrangement. Disc-retainer teeth 338 block rotation of memory disc 336 when seat-motion controller 16 is in the gross-movement arrangement to store information indicative of the selected memory position of seat back 14.

Cover 334 includes a side wall 342, an end wall 344, and a rim 346 as shown in FIG. 25. Side wall 342 is arranged circumferentially around seat-back pivot axis 15. End wall 344 extends radially inward from side wall 342 toward seat-back pivot axis 15 and is formed to include an aperture 350 that receives cam-shaft assembly 50. Rim 346 is spaced apart axially from end wall 344 and extends radially outward away from side wall 342.

Side wall 342 is formed to include guide channels 348 that extend radially outward into side wall 342 as shown in FIG. 25. Side wall 342 further includes disc-support surface 360 located adjacent rim 346. Guide channels 348 extend axially into side wall 342 through disc-support surface 360 toward end wall 344. Guide channels 348 are sized to receive guide tabs 358 included in memory disc 336. In the illustrative embodiment, side wall 342 is formed to include two guide channels 348.

Rim 346 is formed to include guide tabs 352 as shown in FIG. 25. Guide tabs 352 extend radially outward away from seat-back pivot axis 15. Guide tabs 352 are received in tab receivers 90 formed in mobile flange 24 to couple cover 334 to mobile flange 24 for rotational movement with mobile flange 24. In the illustrative embodiment, rim 346 is formed to include two guide tabs 352. In other embodiments, rim 346 includes one or more guide tabs 352. In other embodiments, guide tabs 352 are omitted and cover 334 is coupled to mobile flange 24 using other suitable alternatives.

Memory disc 336 is coupled to rotor 54 for axial movement therewith. Memory disc 336 is free to rotate about seat-back pivot axis relative to cam-shaft assembly 50. In the illustrative embodiment, memory disc 336 is located axially between mask 232 of pawl retainer 230 and retainer ring 248.

Memory disc 336 includes a disc body 354, a plurality of disc teeth 356, and guide tabs 358 as shown in FIG. 25. Disc body 354 is arranged circumferentially about seat-back pivot axis 15 is formed to receive rotor 54 included in cam-shaft assembly 50. Disc teeth 356 extend radially outward away from disc body 354 toward side wall 342 of cover 334. Guide tabs 358 extend radially outward away from disc body 354 a greater distance than disc teeth 356 and are adapted to be received in corresponding guide channels 348 formed in cover 334.

Disc-retainer teeth 338 includes a first tooth 3381 and a second tooth 3382 as shown in FIG. 25. First and second tooth 3381, 3382 are coupled to corresponding pins 234. Disc-retainer teeth 338 are configured to mate with disc teeth 356 included in memory disc 336 when seat-motion controller 16 is in the gross-movement arrangement as suggested in FIG. 28.

When seat-motion controller 16 is in the fine-adjustment arrangement, memory disc 336 is aligned axially with side wall 242 and located axially toward end wall 344 included in cover 334 as shown in FIGS. 25 and 26. Guide tabs 358 included in memory disc 336 are received in guide channels 348 of cover 334 to couple memory disc 336 to cover 334 and mobile flange 24 for rotational movement therewith. As a result, when mobile flange 24 is rotated by mode controller 28, memory disc 226 rotates with mobile flange 24.

Illustratively, pins 234 extend axially into cover 334 and are configured to engage guide tabs 358 of memory disc 336 to limit rotational travel of memory disc 336 and mobile flange 24. In the illustrative embodiment, pins 234 are spaced apart from one another by about 180 degrees. As such, mobile flange 24 is limited to about 180 degrees of rotational travel by pins 234 in the illustrative embodiment. In other embodiments, pins 234 do not extend to memory disc 336 so that rotational travel of memory disc 336 and mobile flange 24 is not limited. Disc-retainer teeth 338 extend axially partway along pins 234 and are spaced apart from disc teeth 356 of memory disc 336 when seat-motion controller 16 is in the fine-adjustment arraignment.

To move seat-motion controller 16 from the fine-adjustment arrangement to the gross-movement arrangement, actuator 20 overcomes bias force $F_b$ to cause cam-shaft assembly 50 to move axially toward fixed flange 22 as suggested in FIG. 28. When seat-motion controller 16 is moved to the gross-movement arrangement, memory disc 336 moves axially with rotor 54. As a result, memory disc 336 is spaced apart axially from side wall 242 of cover 334 as shown in FIGS. 28 and 30. Guide tabs 358 are spaced axially apart from guide channels 348 to create a clearance between guide tabs 358 and guide channels 248 so that memory disc 336 is no longer coupled to cover 334 and mobile flange 24 for rotation therewith.

As cam-shaft assembly 50 moves from the extended position to the retracted position, disc-retainer teeth 338 mate with disc teeth 356 of memory disc 336 before cam-shaft assembly 50 is fully in the retracted position. As such, disc-retainer teeth 338 mate with disc teeth 356 of memory disc 336 before guide tabs 358 are spaced apart axially from guide channels 348 to block rotation of memory disc 336 and mobile flange 24 while cam-shaft assembly 50 is moving from the extended position to the retracted position.

In the gross-movement arrangement, disc teeth 356 mate with disc-retainer teeth 338 located on pins 234 to block rotation of memory disc 336 about seat-back pivot axis 15 as suggested in FIGS. 28 and 29. As a result, the selected memory position of mobile flange 24 and, thus, of seat back 14 is stored with memory disc 336 while memory disc 336 is blocked from rotating relative to fixed flange 22.

Cover 334 and mobile flange 24 are free to rotate about seat-back pivot axis relative to memory disc 336 and fixed flange 22 as suggested in FIGS. 30-33. Rotation of cover 334 and mobile flange 24 causes guide channels 348 formed in cover 334 to become misaligned circumferentially with guide tabs 358 of memory disc 336 as shown in FIGS. 31 and 32. As a result, disc-support surface 360 included in side wall 342 blocks axial movement of guide tabs 358 included in memory disc 336 toward end wall 344 of cover 334. Memory disc 336 and cam-shaft assembly 50 are blocked from moving from the retracted position to the extended position while guide channels 348 are misaligned with guide tabs 358. As a result, seat-motion controller 16 is blocked from moving from the gross-movement arrangement to the fine-adjustment arrangement while guide channels 348 are misaligned with guide tabs 358.

Memory disc 336 and cam-shaft assembly 50 are free to move from the retracted position to the extended position in response to guide channels 348 realigning circumferentially with guide tabs 358. Because memory disc 336 has been blocked from rotating relative to fixed flange 22, guide channels 348 are realigned circumferentially with guide tabs 358 only when seat back 14 is returned to the selected memory position.

Figure 33:
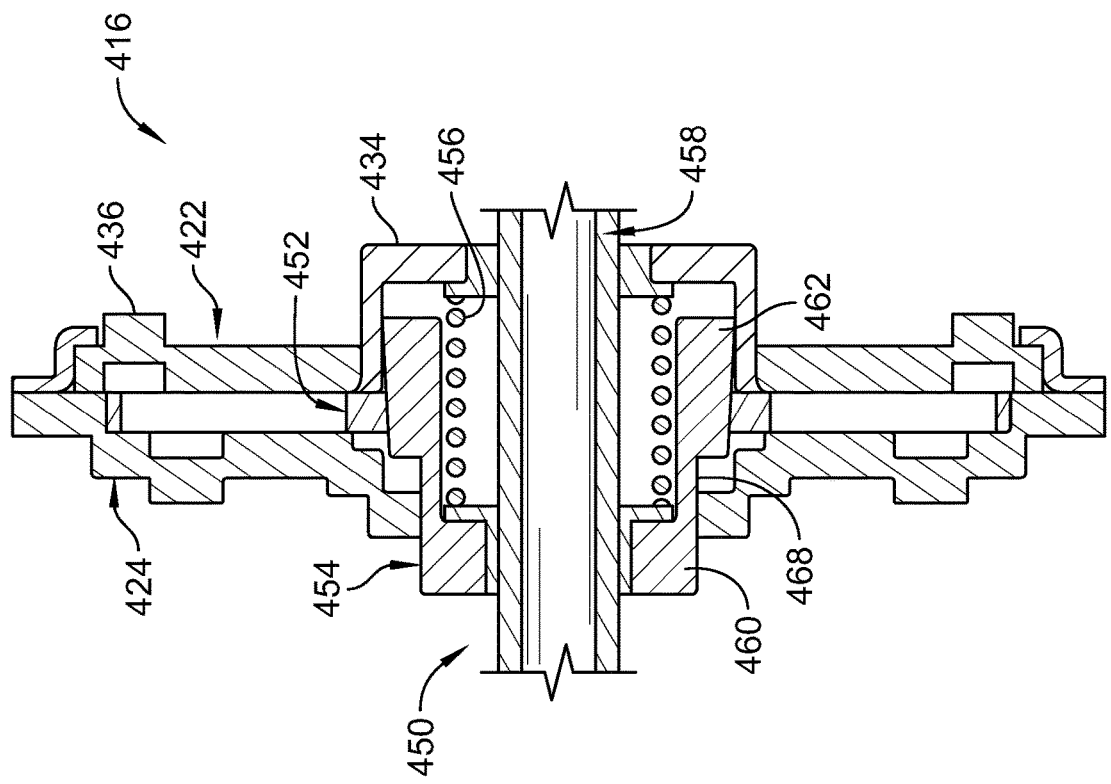
FIG. 33 is another embodiment of a seat-motion controller having a mobile flange, a fixed flange, and a mode controller.

Another embodiment of a seat-motion controller 416 in accordance with the present disclosure is shown in FIG. 33. Seat-motion controller 416 includes a fixed flange 422, a mobile flange 424, and a seat-motion controller 416 having a mode controller 428. Seat-motion controller 416 does not include a pawl retainer or a memory-return controller.

Mode controller 428 includes a cam-shaft assembly 450 and a plurality of pawls 452. Cam-shaft assembly 450 includes a rotor 454, a bias member 456, and a drive shaft 458. Rotor 454 includes a central hub 460 and a cam 462. Cam 462 is configured to push the plurality of pawls 452 radially outward to control movement of occupant support 10 in the fine-adjustment mode. Cam-shaft assembly 450 is configured to move axially to cause central hub 460 to align with the plurality of pawls 452 so that occupant support 10 may be moved in the gross-movement mode.

The following numbered clauses include embodiments that are contemplated and non-limiting:

Clause 1. An occupant support comprising a seat bottom, a seat back coupled to the seat bottom for movement about a seat-back pivot axis relative to the seat bottom between an upright position and a folded-forward position, and a seat-motion controller configured to provide means for controlling movement of the occupant support in one of a fine-adjustment mode in which the seat back rotates about the seat-back pivot axis relative to the seat bottom between the upright position and the folded-forward position in response to power being supplied to a motor connected to the seat-motion controller and is blocked from rotating relative to the seat bottom while power is not supplied to the motor to lock the seat back in a selected memory position relative to the seat bottom and a gross-movement mode in which the seat back rotates about the seat-back pivot axis relative to the seat bottom between the upright position and the folded-forward position in response to a folding force applied to the seat back without supplying power to the motor.

Clause 2. The occupant support of clause 1, any other clause, or any combination of clauses, wherein the seat-motion controller includes a fixed flange coupled to the seat bottom, a mobile flange coupled to the seat back for rotation with the seat back about the seat-back pivot axis relative to the fixed flange, and a recliner control unit that includes a mode controller including a cam-shaft assembly that extends axially along the seat-back pivot axis and a plurality of pawls arranged circumferentially around the cam-shaft assembly, the mobile flange is arranged circumferentially around the plurality of pawls, and the cam-shaft assembly is configured to move axially relative to the seat-back pivot axis between an extended position in which the cam-shaft assembly pushes at least one and less than all of the plurality of pawls radially outward away from the seat-back pivot axis toward the mobile flange to cause the occupant support to be movable in the fine-adjustment mode and a retracted position in which the plurality of pawls are free to move radially inward toward the cam-shaft assembly and away from the mobile flange to cause the occupant support to be movable in the gross-movement mode.

Clause 3. The occupant support of clause 2, any other clause, or any combination of clauses, wherein the cam-shaft assembly is configured to rotate about the seat-back pivot axis in response to power being supplied to the motor and the cam-shaft assembly is configured to push the plurality of pawls radially outward in a predetermined sequence as the cam-shaft assembly rotates when the cam-shaft assembly is in the extended position so that the plurality of pawls apply a rotational force to the mobile flange which causes the mobile flange to rotate about the seat-back pivot axis relative to the fixed flange.

Clause 4. The occupant support of clause 2, any other clause, or any combination of clauses, wherein the cam-shaft assembly includes a rotor, a drive shaft, and a bias member, the rotor is configured to push the at least one and less than all of the plurality of pawls radially outward when the cam-shaft assembly is in the extended position and to allow the plurality of pawls to move radially inward when the cam-shaft assembly is in the retracted position, the drive shaft is coupled to the rotor and to the motor and configured to rotate the rotor in response to power being supplied to the motor, the bias member biases the cam-shaft assembly toward the extended position.

Clause 5. The occupant support of clause 4, any other clause, or any combination of clauses, wherein the rotor includes a central hub that extends along the seat-back pivot axis and an eccentric shaped cam that extends radially outward away from the central hub toward the mobile flange, the eccentric shaped cam is aligned axially with the plurality of pawls and pushes the at least one and less than all of the plurality of pawls radially outward when the cam-shaft assembly is in the extended position, and the central hub is aligned axially with the plurality of pawls and has a smaller maximum radius than the eccentric shaped cam to allow the plurality of pawls to move radially inward toward the central hub when the cam-shaft assembly is in the retracted position.

Clause 6. The occupant support of clause 2, any other clause, or any combination of clauses, wherein the recliner control unit further includes a pawl retainer coupled to the cam-shaft assembly for axial movement therewith and the pawl retainer is configured to allow radial movement of the plurality of pawls relative to the seat-back pivot axis when the cam-shaft assembly is in the extended position and to block radial movement of the plurality of pawls relative to the seat-back pivot axis when the cam-shaft assembly is in the retracted position.

Clause 7. The occupant support of clause 6, any other clause, or any combination of clauses, wherein each of the plurality of pawls is formed to include a pawl-guide slot, the pawl retainer includes a mask having a mask body and a plurality of pawl-retainer tabs that extend axially outward away from the mask body toward the fixed flange, and each pawl-retainer tab is received in a corresponding one of the pawl-guide slots to block radial movement of the plurality of pawls when the cam-shaft assembly is in the retracted position.

Clause 8. The occupant support of clause 2, any other clause, or any combination of clauses, wherein the recliner control unit further includes a memory-return controller configured to block the cam-shaft assembly from moving from the retracted position to the extended position while the occupant support is not in the selected memory position.

Clause 9. The occupant support of clause 8, any other clause, or any combination of clauses, wherein the memory-return controller includes a cover fixed to the mobile flange for rotation with the mobile flange and a memory disc coupled to the cam-shaft assembly for axial movement with the cam-shaft assembly.

Clause 10. The occupant support of clause 9, any other clause, or any combination of clauses, wherein the cover is formed to include an axially extending guide channel and the memory disc includes a disc body and a guide tab that extends radially outward away from the disc body, the guide tab included in the memory disc is received in the guide channel formed in the cover when the cam-shaft assembly is in the extended position so that the memory disc is rotatably coupled to the cover, and the guide tab included in the memory disc is located out of the guide channel formed in the cover when the cam-shaft assembly is in the retracted position so that the cover is free to rotate relative to the memory disc.

Clause 11. The occupant support of clause 10, any other clause, or any combination of clauses, wherein the memory-return controller further includes a disc-retainer tooth coupled to the fixed flange for movement therewith, the memory disc further includes a plurality of disc teeth that extend radially outward away from the disc body, the disc teeth are spaced apart axially from the disc-retainer tooth when the cam-shaft assembly is in the extended position, and the plurality of disc teeth mate with the disc-retainer tooth when the cam-shaft assembly is in the retracted position to block the memory disc from rotating about the seat-back pivot axis relative to the fixed flange.

Clause 12. The occupant support of clause 11, any other clause, or any combination of clauses, wherein axial movement of the guide tab included in the memory disc away from the fixed flange is blocked by the cover included in the memory-return controller while the guide channel formed in the cover is misaligned with the guide tab so that axial movement of the cam-shaft assembly from the retracted position to the extended position is blocked.

Clause 13. An occupant support comprising a seat bottom, a seat back coupled to the seat bottom for movement about a seat-back pivot axis relative to the seat bottom between an upright position and a folded-forward position, and a seat-motion controller configured to control movement of the occupant support in one of a fine-adjustment mode and a gross-movement mode, the seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange in response to a rotational force applied to the recliner control unit and to block rotation of the mobile flange about the seat-back pivot axis relative to the fixed flange in response to the rotational force being removed from the recliner control unit to lock the seat back in a selected memory position relative to the seat bottom when the occupant support is in the fine-adjustment mode and to allow the mobile flange to rotate freely about the seat-back pivot axis relative to the fixed flange when the occupant support is in the gross-movement mode.

Clause 14. The occupant support of clause 13, any other clause, or any combination of clauses, wherein the recliner control unit includes a mode controller that includes a cam-shaft assembly that extends axially into the fixed flange and the mobile flange and a plurality of pawls that are arranged circumferentially around the cam-shaft assembly and that are aligned axially with the mobile flange, the cam-shaft assembly is configured to move axially relative to the seat-back pivot axis between an extended position in which the cam-shaft assembly pushes at least one of the plurality of pawls radially outward away from the cam-shaft assembly toward the mobile flange and a retracted position in which the plurality of pawls are free to move radially inward toward the cam-shaft assembly away from the mobile flange.

Clause 15. The occupant support of clause 14, any other clause, or any combination of clauses, wherein the cam-shaft assembly includes a rotor having a cam and a central hub, the cam is aligned axially with the plurality of pawls and configured to push the at least one of the plurality of pawls radially outward when the cam-shaft assembly is in the extended position, and the central hub is aligned axially with the plurality of pawls and configured to allow the plurality of pawls to move radially inward toward the rotor when the cam-shaft assembly is in the retracted position.

Clause 16. The occupant support of clause 15, any other clause, or any combination of clauses, wherein the cam has an ovular shaped cross-section when viewed along the seat-back pivot axis.

Clause 17. The occupant support of clause 15, any other clause, or any combination of clauses, wherein the mobile flange includes a plurality of flange teeth that extend radially inward toward the plurality of pawls, each of the plurality of pawls include a plurality of pawl teeth that extend radially outward toward the flange teeth included in the mobile flange, and the pawl teeth are configured to mate with the flange teeth when a corresponding pawl is pushed radially outward toward the mobile flange by the cam.

Clause 18. The occupant support of clause 14, any other clause, or any combination of clauses, wherein the cam-shaft assembly is configured to rotate about the seat-back pivot axis and push the plurality of pawls radially outward in a predetermined order to cause the pawls to apply a net rotational force to the mobile flange when the cam-shaft assembly is in the extended position.

Clause 19. The occupant support of clause 18, any other clause, or any combination of clauses, wherein the predetermined order is a sequential order in one of a clockwise and a counter-clockwise direction.

Clause 20. The occupant support of clause 14, any other clause, or any combination of clauses, wherein the fixed flange includes a static-disc body, a plurality of guide wedges, and a plurality of rails, the guide wedges and the rails extend axially away from the static-disc body toward the mobile flange, the plurality of guide wedges are spaced apart circumferentially from one another, and each rail is located between neighboring guide wedges.

Clause 21. The occupant support of clause 20, any other clause, or any combination of clauses, wherein each of the plurality of pawls is located between neighboring guide wedges and the plurality of guide wedges cooperate to limit the pawls to radial movement.

Clause 22. The occupant support of clause 21, any other clause, or any combination of clauses, wherein each of the plurality of pawls is formed to define a pawl-guide slot and each rail included in the fixed flange extends through the pawl-guide slot of a correspond pawl to further limit the pawls to radial movement.

Clause 23. The occupant support of clause 14, any other clause, or any combination of clauses, wherein the recliner control unit further includes a pawl retainer coupled to the cam-shaft assembly for axial movement therewith and the pawl retainer is configured to allow radial movement of the plurality of pawls relative to the seat-back pivot axis when the cam-shaft assembly is in the extended position and to block radial movement of the plurality of pawls relative to the seat-back pivot axis when the cam-shaft assembly is in the retracted position.

Clause 24. The occupant support of clause 23, any other clause, or any combination of clauses, wherein each of the plurality of pawls is formed to include a pawl-guide slot and portions of the pawl retainer extend into the pawl-guide slots when the cam-shaft assembly is in the retracted position to block radial outward movement of the pawls.

Clause 25. The occupant support of clause 23, any other clause, or any combination of clauses, wherein the pawl retainer includes a pin and a mask, the pin is coupled to the fixed flange for movement therewith, the mask is formed to include a pin-receiver slot, the mask includes a mask body and a plurality of pawl-retainer tabs that extend axially outward away from the mask body toward the fixed flange, the pin extends into the pin-receiver slot to block rotation of the mask about the seat-back pivot axis relative to the fixed flange when the cam-shaft assembly is in the extended position and the retracted position, and each pawl-retainer tab extends into a corresponding one of the pawl-guide slots to block radial outward movement of the plurality of pawls when the cam-shaft assembly is in the retracted position.

Clause 26. The occupant support of clause 14, any other clause, or any combination of clauses, wherein the recliner control unit further includes a memory-return controller configured to block the cam-shaft assembly from moving from the retracted position to the extended position unless the seat back is in the selected memory position.

Clause 27. The occupant support of clause 26, any other clause, or any combination of clauses, wherein the memory-return controller includes a cover fixed to the mobile flange for rotation with the mobile flange and a memory disc coupled to the cam-shaft assembly for axial movement with the cam-shaft assembly.

Clause 28. The occupant support of clause 27, any other clause, or any combination of clauses, wherein the cover is formed to include an axially extending guide channel and the memory disc includes a disc body and a guide tab that extends radially outward away from the disc body, the guide tab included in the memory disc is received in the guide channel formed in the cover when the cam-shaft assembly is in the extended position so that the memory disc is coupled to the cover for rotation with the cover, and the guide tab is located out of the guide channel when the cam-shaft assembly is in the retracted position so that the cover is free to rotate relative to the memory disc.

Clause 29. The occupant support of clause 28, any other clause, or any combination of clauses, wherein the memory-return controller further includes a disc-retainer tooth coupled to a pin that is fixed to the fixed flange, the memory disc further includes a plurality of disc teeth that extend radially outward away from the disc body, the disc teeth are spaced apart axially from the disc-retainer tooth when the cam-shaft assembly is in the extended position, and the plurality of disc teeth mate with the disc-retainer tooth when the cam-shaft assembly is in the retracted position to block the memory disc from rotating about the seat-back pivot axis relative to the fixed flange.

Clause 30. The occupant support of clause 28, any other clause, or any combination of clauses, wherein axial movement of the guide tab included in the memory disc away from the fixed flange is blocked by the cover included in the memory-return controller while the guide channel formed in the cover is misaligned with the guide tab so that axial movement of the cam-shaft assembly from the retracted position to the extended position is blocked.

Clause 31. An occupant support comprising a seat bottom, a seat back coupled to the seat bottom for movement about a seat-back pivot axis relative to the seat bottom between an upright position and a folded-forward position, and a seat-motion controller configured to control movement of the occupant support in one of a fine-adjustment mode and a gross-movement mode, the seat-motion controller including a fixed flange coupled to the seat bottom, a mobile flange coupled to the seat back for rotation with the seat back about the seat-back pivot axis relative to the fixed flange, and a recliner control unit including a mode controller and a pawl retainer, wherein the mode controller includes a cam-shaft assembly that extends axially relative to the seat-back pivot axis and a plurality of pawls that are arranged circumferentially around the cam-shaft assembly and that are aligned axially with the mobile flange, the cam-shaft assembly is configured to move axially relative to the seat-back pivot axis between an extended position in which the cam-shaft assembly pushes at least one of the plurality of pawls radially outward away from the cam-shaft assembly toward the mobile flange and a retracted position in which the plurality of pawls are free to move radially inward toward the cam-shaft assembly away from the mobile flange, and wherein the pawl retainer is coupled to the cam-shaft assembly for axial movement therewith and the pawl retainer is configured to allow radial movement of the plurality of pawls relative to the seat-back pivot axis when the cam-shaft assembly is in the extended position and to block radial movement of the plurality of pawls relative to the seat-back pivot axis when the cam-shaft assembly is in the retracted position.

Clause 32. The occupant support of clause 31, any other clause, or any combination of clauses, wherein each of the plurality of pawls is formed to include a pawl-guide slot and portions of the pawl retainer extend into the pawl-guide slots when the cam-shaft assembly is in the retracted position to block radial outward movement of the pawls.

Clause 33. The occupant support of clause 32, any other clause, or any combination of clauses, wherein the pawl retainer includes a pin and a mask, the pin is coupled to the fixed flange for movement therewith, the mask is formed to include a pin-receiver slot, the mask includes a mask body and a plurality of pawl-retainer tabs that extend axially outward away from the mask body toward the fixed flange, the pin extends into the pin-receiver slot to block rotation of the mask about the seat-back pivot axis relative to the fixed flange when the cam-shaft assembly is in the extended position and the retracted position, and each pawl-retainer tab extends into a corresponding one of the pawl-guide slots to block radial outward movement of the plurality of pawls when the cam-shaft assembly is in the retracted position.

Clause 34. A method of moving an occupant support, the method comprising providing a seat bottom, a seat back coupled to the seat bottom for movement about a seat-back pivot axis relative to the seat bottom between an upright position and a folded-forward position, and a seat-motion controller configured to control movement of the seat back relative to the seat bottom, the seat-motion controller including a fixed flange coupled to the seat bottom, a mobile flange coupled to the seat back for rotation with the seat back about the seat-back pivot axis relative to the fixed flange, and a recliner control unit including a mode controller that includes a cam-shaft assembly and a plurality of pawls that are arranged circumferentially around the cam-shaft assembly and that are aligned axially with the mobile flange, blocking rotation of the cam-shaft assembly about the seat-back pivot axis relative to the fixed flange to block rotation of the mobile flange about the seat-back pivot axis relative to the fixed flange, and rotating the cam-shaft assembly about the seat-back pivot axis relative to the fixed flange to cause the cam-shaft assembly to push the plurality of pawls radially outward away from the cam-shaft assembly toward the mobile flange in a predetermined order to cause the pawls to apply a rotational force to the mobile flange so that the mobile flange rotates about the seat-back pivot axis relative to the fixed flange.

Clause 35. The method of clause 34, any other clause, or any combination of clauses, further comprising moving the cam-shaft assembly axially relative to the seat-back pivot axis from an extended position to a retracted position to allow the plurality of pawls to move radially inward toward the cam-shaft assembly and away from the mobile flange so that the mobile flange is free to rotate about the seat-back pivot axis relative to the fixed flange.

Clause 36. The method of clause 35, any other clause, or any combination of clauses, further comprising setting a selected memory position of the seat back relative to the seat bottom, allowing axial movement of the cam-shaft assembly when the seat back is in the selected memory position, and blocking axial movement of the cam-shaft assembly in response to the seat back moving out of the selected memory position.

The invention claimed is:

1. An occupant support comprising
a seat bottom,
a seat back coupled to the seat bottom for movement about a seat-back pivot axis relative to the seat bottom between an upright position and a folded-forward position, and
a seat-motion controller configured to control movement of the occupant support in one of a fine-adjustment mode and a gross-movement mode, the seat-motion controller including a fixed flange coupled to the seat bottom, a mobile flange couple to the seat back for rotation with the seat back about the seat-back pivot axis relative to the fixed flange, and a recliner control unit configured to rotate the mobile flange about the seat-back pivot axis relative to the fixed flange in response to a rotational force applied to the recliner control unit and to block rotation of the mobile flange about the seat-back pivot axis relative to the fixed flange in response to the rotational force being removed from the recliner control unit to lock the seat back in a selected memory position relative to the seat bottom when the occupant support is in the fine-adjustment mode and to allow the mobile flange to rotate freely about the seat-back pivot axis relative to the fixed flange when the occupant support is in the gross-movement mode,
wherein the recliner control unit includes a mode controller that includes a cam-shaft unit that extends axially into the fixed flange and the mobile flange and a plurality of pawls that are arranged circumferentially around the cam-shaft unit and that are aligned axially with the mobile flange, the cam-shaft unit is configured to move axially relative to the seat-back pivot axis between an extended position in which the cam-shaft unit pushes at least one of the plurality of pawls radially outward away from the cam-shaft unit toward the mobile flange and a retracted position in which the plurality of pawls are free to move radially inward toward the cam-shaft unit away from the mobile flange,
wherein the fixed flange includes a static-disc body, a plurality of guide wedges, and a plurality of rails, the guide wedges and the rails extend axially away from the static-disc body toward the mobile flange, the plurality of guide wedges are spaced apart circumferentially from one another, and each rail is located between neighboring guide wedges.

2. An occupant support comprising
a seat bottom,
a seat back coupled to the seat bottom for movement about a seat-back pivot axis relative to the seat bottom between an upright position and a folded-forward position, and
a seat-motion controller configured to provide means for controlling movement of the occupant support in one of a fine-adjustment mode in which the seat back rotates about the seat-back pivot axis relative to the seat bottom between the upright position and the folded-forward position in response to power being supplied to a motor connected to the seat-motion controller and is blocked from rotating relative to the seat bottom while power is not supplied to the motor to lock the seat back in a selected memory position relative to the seat bottom and a gross-movement mode in which the seat back rotates about the seat-back pivot axis relative to the seat bottom between the upright position and the folded-forward position in response to a folding force applied to the seat back without supplying power to the motor, wherein the seat-motion controller includes a fixed flange coupled to the seat bottom, a mobile flange coupled to the seat back for rotation with the seat back about the seat-back pivot axis relative to the fixed flange, and a recliner control unit that includes a mode controller including a cam-shaft unit arranged to extend axially along the seat-back pivot axis and a plurality of pawls arranged circumferentially around the cam-shaft unit, the mobile flange is arranged circumferentially around the plurality of pawls, and the cam-shaft unit is configured to move axially relative to the seat-back pivot axis between an extended position in which the cam-shaft unit pushes at least one and less than all of the plurality of pawls radially outward away from the seat-back pivot axis toward the mobile flange to cause the occupant support to be movable in the fine-adjustment mode and a retracted position in which the plurality of pawls are free to move radially inward toward the cam-shaft unit and away from the mobile flange to cause the occupant support to be movable in the gross-movement mode.

3. The occupant support of claim 2, wherein the cam-shaft unit is configured to rotate about the seat-back pivot axis in response to power being supplied to the motor and the cam-shaft unit is configured to push the plurality of pawls radially outward in a predetermined sequence as the cam-shaft unit rotates when the cam-shaft unit is in the extended position so that the plurality of pawls apply a rotational force to the mobile flange which causes the mobile flange to rotate about the seat-back pivot axis relative to the fixed flange.

4. The occupant support of claim 2, wherein the cam-shaft unit includes a rotor, a drive shaft, and a bias member, the rotor is configured to push the at least one and less than all of the plurality of pawls radially outward when the cam-shaft unit is in the extended position and to allow the plurality of pawls to move radially inward when the cam-shaft unit is in the retracted position, the drive shaft is coupled to the rotor and to the motor and configured to rotate the rotor in response to power being supplied to the motor, the bias member biases the cam-shaft unit toward the extended position.

5. The occupant support of claim 4, wherein the rotor includes a central hub that extends along the seat-back pivot axis and an eccentric shaped cam that extends radially outward away from the central hub toward the mobile flange, the eccentric shaped cam is aligned axially with the plurality of pawls and pushes the at least one and less than all of the plurality of pawls radially outward when the cam-shaft unit is in the extended position, and the central hub is aligned axially with the plurality of pawls and has a smaller maximum radius than the eccentric shaped cam to allow the plurality of pawls to move radially inward toward the central hub when the cam-shaft unit is in the retracted position.

6. The occupant support of claim 2, wherein the recliner control unit further includes a pawl retainer coupled to the cam-shaft unit for axial movement therewith and the pawl retainer is configured to allow radial movement of the plurality of pawls relative to the seat-back pivot axis when the cam-shaft unit is in the extended position and to block radial movement of the plurality of pawls relative to the seat-back pivot axis when the cam-shaft unit is in the retracted position.

7. The occupant support of claim 6, wherein each of the plurality of pawls is formed to include a pawl-guide slot, the pawl retainer includes a mask having a mask body and a plurality of pawl-retainer tabs that extend axially outward away from the mask body toward the fixed flange, and each pawl-retainer tab is received in a corresponding one of the pawl-guide slots to block radial movement of the plurality of pawls when the cam-shaft unit is in the retracted position.

8. The occupant support of claim 2, wherein the recliner control unit further includes a memory-return controller configured to block the cam-shaft unit from moving from the retracted position to the extended position while the occupant support is not in the selected memory position.

9. The occupant support of claim 8, wherein the memory-return controller includes a cover fixed to the mobile flange for rotation with the mobile flange and a memory disc coupled to the cam-shaft assembly for axial movement with the cam-shaft unit.

10. The occupant support of claim 9, wherein the cover is formed to include an axially extending guide channel and the memory disc includes a disc body and a guide tab that extends radially outward away from the disc body, the guide tab included in the memory disc is received in the guide channel formed in the cover when the cam-shaft assembly is in the extended position so that the memory disc is rotatably coupled to the cover, and the guide tab included in the memory disc is located out of the guide channel formed in the cover when the cam-shaft unit is in the retracted position so that the cover is free to rotate relative to the memory disc.

11. The occupant support of claim 10, wherein the memory-return controller further includes a disc-retainer tooth coupled to the fixed flange for movement therewith, the memory disc further includes a plurality of disc teeth that extend radially outward away from the disc body, the disc teeth are spaced apart axially from the disc-retainer tooth when the cam-shaft unit is in the extended position, and the plurality of disc teeth mate with the disc-retainer tooth when the cam-shaft unit is in the retracted position to block the memory disc from rotating about the seat-back pivot axis relative to the fixed flange.

12. The occupant support of claim 11, wherein axial movement of the guide tab included in the memory disc away from the fixed flange is blocked by the cover included in the memory-return controller while the guide channel formed in the cover is misaligned with the guide tab so that axial movement of the cam-shaft unit from the retracted position to the extended position is blocked.

13. An occupant support comprising
a seat bottom,
a seat back coupled to the seat bottom for movement about a seat-back pivot axis relative to the seat bottom between an upright position and a folded-forward position, and
a seat-motion controller configured to control movement of the occupant support in one of a fine-adjustment mode and a gross-movement mode, the seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange in response to a rotational force applied to the recliner control unit and to block rotation of the mobile flange about the seat-back pivot axis relative to the fixed flange in response to the rotational force being removed from the recliner control unit to lock the seat back in a selected memory position relative to the seat bottom when the occupant support is in the fine-adjustment mode and to allow the mobile flange to rotate freely about the seat-back pivot axis relative to the fixed flange when the occupant support is in the gross-movement mode, wherein the recliner control unit includes a mode controller that includes a cam-shaft unit that extends axially into the fixed flange and the mobile flange and a plurality of pawls that are arranged circumferentially around the cam-shaft unit and that are aligned axially with the mobile flange, the cam-shaft unit is configured to move axially relative to the seat-back pivot axis between an extended position in which the cam-shaft unit pushes at least one of the plurality of pawls radially outward away from the cam-shaft unit toward the mobile flange and a retracted position in which the plurality of pawls are free to move radially inward toward the cam-shaft unit away from the mobile flange.

14. The occupant support of claim 13, wherein the predetermined order is a sequential order in one of a clockwise and a counter-clockwise direction.

15. The occupant support of claim 13, wherein the cam-shaft unit includes a rotor having a cam and a central hub, the cam is aligned axially with the plurality of pawls and configured to push the at least one of the plurality of pawls radially outward when the cam-shaft unit is in the extended position, and the central hub is aligned axially with the plurality of pawls and configured to allow the plurality of pawls to move radially inward toward the rotor when the cam-shaft unit is in the retracted position.

16. The occupant support of claim 15, wherein the cam has an ovular shaped cross-section when viewed along the seat-back pivot axis.

17. The occupant support of claim 15, wherein the mobile flange includes a plurality of flange teeth that extend radially inward toward the plurality of pawls, each of the plurality of pawls include a plurality of pawl teeth that extend radially outward toward the flange teeth included in the mobile flange, and the pawl teeth are configured to mate with the flange teeth when a corresponding pawl is pushed radially outward toward the mobile flange by the cam.

\* \* \* \* \*